US012707430B2

(12) United States Patent
Dwivedi et al.

(10) Patent No.: US 12,707,430 B2
(45) Date of Patent: Aug. 11, 2026

(54) METHODS AND DEVICES FOR NETWORK LINK MEASUREMENT

(71) Applicant: TELEFONAKTIEBOLAGET LM ERICSSON (PUBL), Stockholm (SE)

(72) Inventors: Satyam Dwivedi, Solna (SE); Gustav Lindmark, Linköping (SE); Niklas Jaldén, Enköping (SE); Fredrik Gunnarsson, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 323 days.

(21) Appl. No.: 18/290,426

(22) PCT Filed: May 12, 2022

(86) PCT No.: PCT/EP2022/062958
§ 371 (c)(1),
(2) Date: Nov. 13, 2023

(87) PCT Pub. No.: WO2022/238540
PCT Pub. Date: Nov. 17, 2022

(65) Prior Publication Data

US 2024/0251379 A1 Jul. 25, 2024

Related U.S. Application Data

(60) Provisional application No. 63/187,785, filed on May 12, 2021.

(51) Int. Cl.
*H04W 64/00* (2009.01)
*H04W 24/04* (2009.01)

(52) U.S. Cl.
CPC ......... *H04W 64/006* (2013.01); *H04W 24/04* (2013.01)

(58) Field of Classification Search
CPC . H04W 64/00; H04W 64/003; H04W 64/006; H04W 24/00; H04W 24/02; H04W 24/04; H04L 25/02; H04L 25/0212
See application file for complete search history.

(56) References Cited

U.S. PATENT DOCUMENTS 10,779,176 B2 9/2020 Park et al.
2006/0233097 A1 10/2006 Vrcelj et al.
(Continued)

FOREIGN PATENT DOCUMENTS

EP 1624636 B1 7/2008
EP 3086524 A1 10/2016
(Continued)

OTHER PUBLICATIONS

International Search Report and Written Opinion in International Application No. PCT/SE2021/050652 issued on Mar. 4, 2022 (12 pages).
(Continued)

*Primary Examiner* — Siu M Lee
(74) *Attorney, Agent, or Firm* — Rothwell, Figg, Ernst & Manbeck, P.C.

(57) ABSTRACT

Methods and devices for measuring and reporting channel conditions, determining link status, and evaluating the reliability of measurements and determinations. A method is provided comprising receiving (551) first Channel Impulse Response, CIR, information for a device and second CIR information for a network node; and performing (553) a comparison of the received first and second CIR information. The method optionally comprises evaluating (554) reliability of the received channel information or a related positional determination.

22 Claims, 12 Drawing Sheets

(56) References Cited

U.S. PATENT DOCUMENTS

| | | | | |
|---|---|---|---|---|
| 2010/0067632 | A1 | 3/2010 | Jia | |
| 2013/0279637 | A1 | 10/2013 | Kent | |
| 2015/0365975 | A1 | 12/2015 | Sahlin et al. | |
| 2017/0086153 | A1 | 3/2017 | Yoon et al. | |
| 2018/0217228 | A1 | 8/2018 | Edge et al. | |
| 2019/0007181 | A1 | 1/2019 | Marinier et al. | |
| 2019/0090092 | A1 | 3/2019 | Hwang et al. | |
| 2021/0075526 | A1* | 3/2021 | Pefkianakis | H04B 7/0691 |
| 2021/0392022 | A1 | 12/2021 | Iwai et al. | |
| 2022/0070028 | A1* | 3/2022 | Yerramalli | G06N 3/09 |
| 2022/0322035 | A1* | 10/2022 | Fakoorian | G01S 5/08 |

FOREIGN PATENT DOCUMENTS

| | | | |
|---|---|---|---|
| EP | 3675444 | A1 | 7/2020 |
| WO | 2020028517 | A1 | 2/2020 |

OTHER PUBLICATIONS

Liang et al., "Low-complexity Timing Synchronization Scheme for MD-OFDM UWB Receiver Based on Sign-bit", IEEE, 2012 (5 pages).

Zhao et al., "OFDM Symbol Timing Synchronization System on a Reconfigurable Instruction Cell Array", IEEE, 2008 (4 pages).

Fan et al., "Robust and Low complexity Packet Detector Design for MB-OFDM UWB", IEEE, 2009, (4 pages).

Fan et al., "Symbol Timing Algorithm for DC-OFDM System", IEEE, 2011 (3 pages).

3 Generation Partnership Project; Technical Specification Group Radio Access Network; LTE Positioning Protocol (LPP) (Release 16), 3GPP, 37355-g40, Mar. 2021 (298 pages).

International Search Report and Written Opinion issued in International Application No. PCT/EP2022/062958 issued on Aug. 26, 2022 (16 pages).

Fraunhofer et al., "Potential positioning enhancements for multipath/NLOS mitigation", 3GPP TSG RAN WGI Meeting #105-e, RI-2105865, e-Meeting, May 10-27, 2021 (7 pages).

Nokia et al., "Views on potential positioning enhancements", 3GPP TSG RAN WG1 #103-e, R1- 2008301, 2020 (13 pages).

Huisken et al., "A Power-Efficient Single-Chip OFDM Demodulator and Channel Decoder for Multimedia Broadcasting", IEEE Journal of Solid-State Circuits, vol. 33, No. 11, Nov. 1998 (6 pages).

Ericsson, "Potential enhancements of information reporting from UE and gNB for multipath/NLOS mitigation", 3GPP TSG-RAN WGI Meeting #105-e, RI-2105912, e-Meeting, May 10-27, 2021 (15 pages).

3GPP TS 38.211 V16.6.0 (Jun. 2021), 3rd Generation Partnership Project; Technical Specification Group Radio Access Network; NR; Physical channels and modulation, (Release 16), Jun. 2021 (134 pages).

* cited by examiner

Test Case 1

| | NLOS | LOS |
|---|---|---|
| NLOS | 94% | 6% |
| LOS | 25% | 75% |

Test Case 2

| | NLOS | LOS |
|---|---|---|
| NLOS | 95% | 5% |
| LOS | 26% | 74% |

Test Case 3

| | NLOS | LOS |
|---|---|---|
| NLOS | 95% | 5% |
| LOS | 24% | 76% |

Test Case 4

| | NLOS | LOS |
|---|---|---|
| NLOS | 95% | 5% |
| LOS | 27% | 73% |

Test Case 5

| | NLOS | LOS |
|---|---|---|
| NLOS | 95% | 5% |
| LOS | 21% | 79% |

Test Case 6

| | NLOS | LOS |
|---|---|---|
| NLOS | 96% | 4% |
| LOS | 16% | 84% |

Test Case 7

| | NLOS | LOS |
|---|---|---|
| NLOS | 95% | 5% |
| LOS | 16% | 84% |

Test Case 8

| | NLOS | LOS |
|---|---|---|
| NLOS | 97% | 3% |
| LOS | 14% | 86% |

Test Case 9

| | NLOS | LOS |
|---|---|---|
| NLOS | 97% | 3% |
| LOS | 13% | 87% |

Test Case 10

| | NLOS | LOS |
|---|---|---|
| NLOS | 98% | 2% |
| LOS | 13% | 87% |

FIG. 12

METHODS AND DEVICES FOR NETWORK LINK MEASUREMENT

CROSS REFERENCE TO RELATED APPLICATIONS

This application is a 35 U.S.C. § 371 National Stage of International Patent Application No. PCT/EP2022/062958, filed May 12, 2022, which claims the benefit of U.S. Provisional Application No. 63/187,785, filed on May 12, 2021. The above-identified applications are incorporated by this reference.

TECHNICAL FIELD

Disclosed are embodiments related to a comparison of first and second channel impulse response information provided by a device and a network node respectively. In particular the comparison may be performed for positioning measurements and detection of whether a network link includes a line-of-site (LOS) or non-line-of-site channel (NLOS).

BACKGROUND

Devices and nodes within a network, such as those within a 5G New Radio (NR) system, can implement one or more positioning processes. As an example, a Location Management Function (LMF) can receive information from the radio access network (RAN) or other devices to determine the position of a user equipment (UE). Positioning or other location-related functions can make use of timing or other channel measurements on the network. For instance, 3GPP Release 16 specifies positioning signals, measurements, procedures, and architecture that may be used in certain applications. However, the reliability of the ultimate location determinations can be impacted by the accuracy of the underlying data. As such, there remains a need for improved network measurement and related reporting from a UE or network node, for instance, for use with positioning or other location evaluation functions within the core network. This includes a need for reliable channel assessment, such as accurate assessment of whether a link is an LOS or NLOS link.

SUMMARY

According to embodiments, a method is provided that comprises receiving first Channel Impulse Response (CIR) information for a device (e.g., user equipment) and second CIR information for a network node (e.g., a gNB), and performing a comparison of the received first and second CIR information. The method may further comprise receiving one or more of measurement window information or a line-of-sight/non-line-of-sight (LOS/NLOS) detection decision from the device or network node. The method may further comprise one or more evaluation or validation steps based on the received information. This could include, for example, evaluating the reliability of the received first or second CIR information based at least in part on the comparison, evaluating the reliability of a position determination for the device based at least in part on the comparison, evaluating the reliability of the LOS/NLOS detection decision by the device or network node based at least in part on the comparison (e.g., validating the decision), and/or evaluating a CIR measurement window placement of the device or network node based at least in part on the comparison. In some embodiments, a response is provided to the device or network node. According to embodiments, a system or apparatus is provided that is configured to perform one or more of the methods, such as a node. The node may be, for instance, a core network node comprising a Location Management Function (LMF) or a network node.

According to embodiments, a method is provided that comprises receiving a signal from a network node, generating a CIR based at least in part on the received signal, and reporting the CIR to an LMF. In some embodiments, the method further comprises performing an LOS/NLOS detection (e.g., for a link with the network node), based at least in part on the generated CIR. According to embodiments, an apparatus is provided that is configured to perform one or more of the methods. For instance, the method may be performed by a user equipment (UE) for reporting channel information.

According to embodiments, a method is provided that comprises receiving a signal from a device, generating a CIR based at least in part on the received signal, and reporting the CIR to an LMF. According to embodiments, a node is configured to perform the method, such as a network node (e.g., gNB).

According to embodiments, a computer program product is provided that comprises a non-transitory computer readable medium storing instructions, which when performed by processing circuitry of a device (e.g., UE or node), causes the device to perform any of foregoing methods.

BRIEF DESCRIPTION OF THE DRAWINGS

The accompanying drawings, which are incorporated herein and form part of the specification, illustrate various embodiments.

FIG. 12 illustrates LOS/NLOS determination results according to embodiments.

DETAILED DESCRIPTION

According to embodiments, the Channel Impulse Response (CIR) measured by a user equipment (UE) and network node can be used together for generating accurate timing analysis and in positioning. In this respect, aspects of the disclosure can provide for CIR fusion between the network and UE for reliable measurements and determinations. For instance, and according to embodiments, a Location Management Function (LMF) collects information from UEs and gNBs to reach an LOS/NLOS decision (line-of-site (LOS) or non-LOS (NLOS) decision) about the link. Instead of the various entities making independent decisions, the LMF uses measurements from both devices and nodes to arrive at a determination about the nature of the link. In effect, this is decision "fusion" at the LMF.

Figure 1:
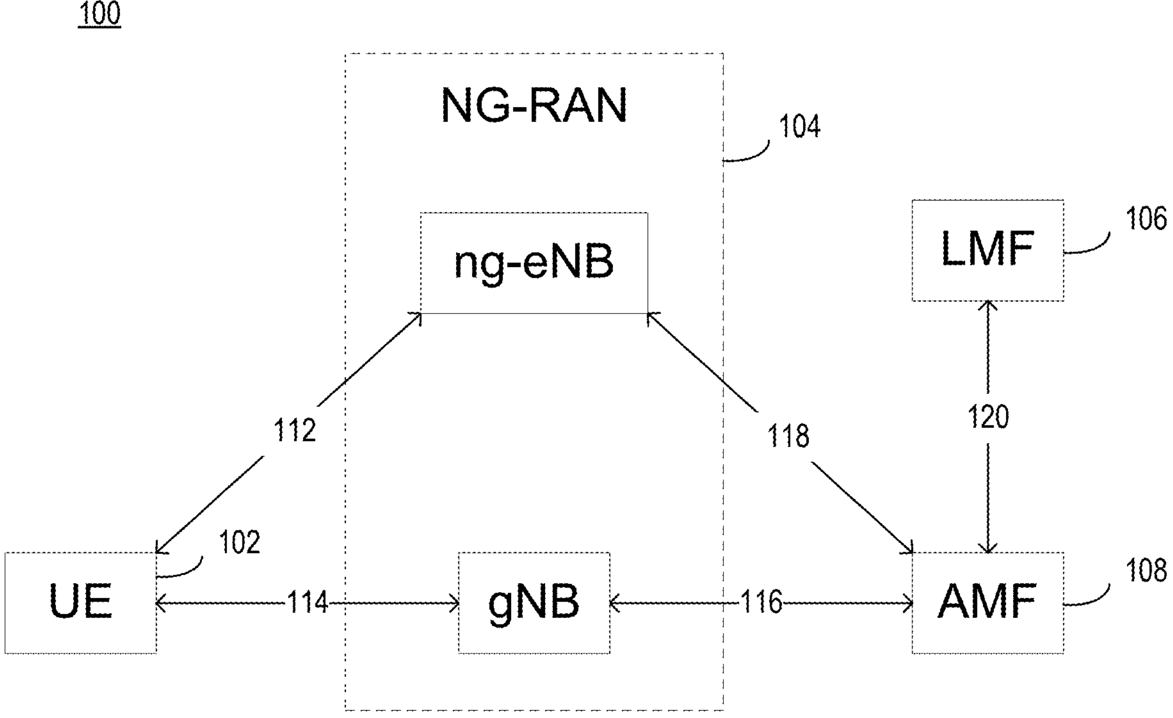
FIG. 1 illustrates a system according to embodiments.

Referring now to FIG. 1, a system 100 is illustrated according to embodiments. The positioning architecture of system 100 may be implemented, for instance, with a UE positioning architecture and logical protocols among different entities, which can be applicable to new radio access networks (e.g., NG-RAN) in a 5G system. In FIG. 1, the protocols and signaling 112, 114, 116, 118 between entities are also shown. In this example, the central node is the LMF 106, which may perform the positioning computation in a network-based positioning setup. The UEs 102 may also perform one or more positioning determinations where device-side positioning is used. In the example of FIG. 1, UEs 102 report their measurements and/or determinations to the LMF 106 via the LTE Positioning Protocol (LPP), and network nodes (e.g., gNB) report their measurements and other information to the LMF via NR Positioning Protocol A (NRPPa). According to embodiments, the LMF receives measurements and other information from the NG-RAN node 104, as well as from the UEs 102 or other devices via an Access and Mobility Management Function (AMF) 108. In certain aspects, the LMF 106 configures the UEs 102 using the LTE positioning protocol (LPP), while the NG-RAN node 104 configures the UEs 102 using the Radio Resource Control (RRC) protocol over LTE-Uu and NR-Uu, for instance. An NR Positioning Protocol A (NRPPa) can be used to carry the positioning information between NG-RAN node 104 and LMF 106 over the next generation control plane interface (NG-C). In FIG. 1, as an example, signaling 112 may be via Radio Resource Control (RRC), signaling 114 may be via RRC and/or LPP, signaling 116 may be via LPP and/or NRPPa, signaling 118 may be via NRPPa, and signaling 120 may be via LPP and/or NRPPA (e.g., over NLs). According to embodiments, while the LMF 106 makes the final positioning and related determinations, the UEs 102 and/or nodes of the NG-RAN 104 may also make initial determinations that are reported to the LMF 106.

In some embodiments, NG-RAN 104 may comprise one or more nodes, and may use a split positioning architecture. In the example of FIG. 1, and in some embodiments, for the gNB functional split, the gNB-Central Unit (CU) and gNB Distributed Units (DU) communicate via F1 interface. The gNB-CU terminates the connection with the 5G Core Network (5GC) and can be connected to one or multiple gNB-DU, which hosts the transmission reception points (TP/RP/TRP). In certain aspects, the gNB(gNB-CU)/ng-eNB at node 104 exchanges the necessary positioning information and measurements with the LMF, which is in the 5GC. For 4G implementations, as another example, the positioning support between a UEs 102 and a location server is handled by LPP.

The first path identified in the CIR for a channel (e.g., between a UE 102 and a node 104) can be very important in detecting the LOS/NLOS nature of the link. However, the first path can be missed due to using an incorrectly set Fast Fourier Transfer (FFT) window when evaluating the CIR. This could include, for instance, using an FFT window configured for communication purposes when detecting paths for computing CIR for positioning purposes. However, it can be important to ensure that the correct CIR is used when performing LOS/NLOS detection using CIR peaks. Embodiments use the CIR at both ends—from the UE 102 and from the node 104 (e.g., a gNB)—to infer various parameters, properties, and issues in the link. This can have a significant impact on the LOS/NLOS detection of the link.

In certain aspects, embodiments can address CIR, positioning, symbol timing, and reliability issues present in existing protocols. There currently exist certain challenges in these areas. Measurements done based on CIR for positioning may still use communications-specific algorithms for generating and selecting portions of the CIR. Often, this may lead to erroneous CIR analysis for making measurements or decisions. One or more embodiments may address this issue. Another issue is that CIR can be measured at both ends—at the UE and at the gNB for the same link. This can result in independent CIR determination and path selection at two different entities about a common, uncertain CIR that may lead to different understandings at the two entities. Erroneous or uncertain measurements can lead to unreliable positioning/location determinations (e.g., at LMF 106).

Certain aspects of the disclosure and their embodiments may provide solutions to these or other challenges. Embodiments may provide for validating and fusing the set of CIR used at the UE- and gNB-ends to reach a decision on the LOS/NLOS nature of the link. In certain aspects, embodiments may be used for validating timing measurements at the two ends for reliable positioning. In some embodiments, the LMF or a general network node collects the CIRs from the UE(s) and gNB(s) and corroborates their CIR. This may be, for instance, based on the reciprocity principle. Certain embodiments may provide one or more of the following technical advantage(s); producing reliable measurements: providing positioning-specific procedures for position estimation (e.g., with higher accuracy in position estimation); improved quality of timing measurements: an LMF that can infer more about the channel from a joint set of CIRs than it could using only one; and establishing the extent of reciprocity of a link.

Figure 2A:
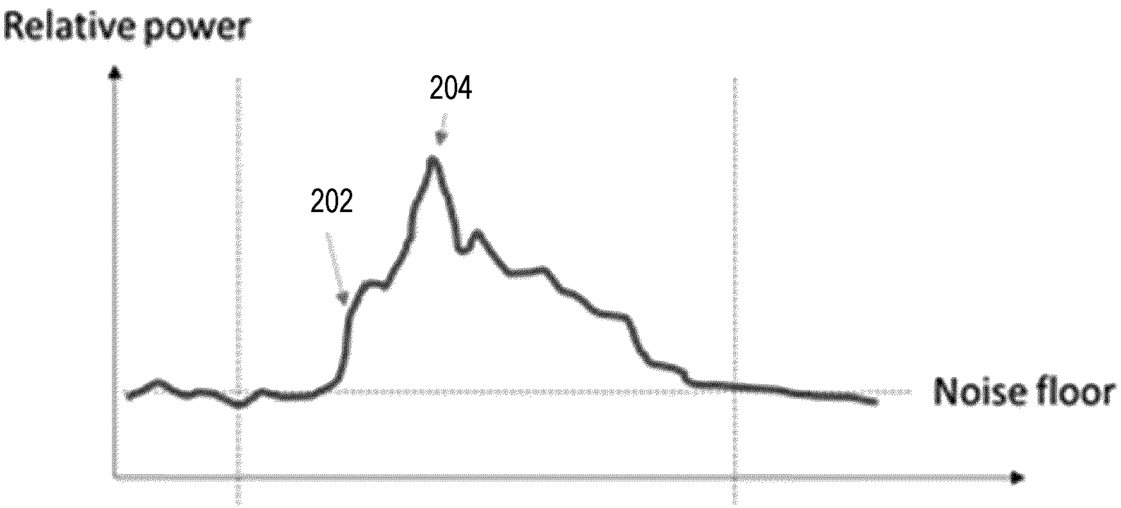
FIG. 2A and FIG. 2B illustrate examples of a power-delay profile of a received signal.
Figure 2B:
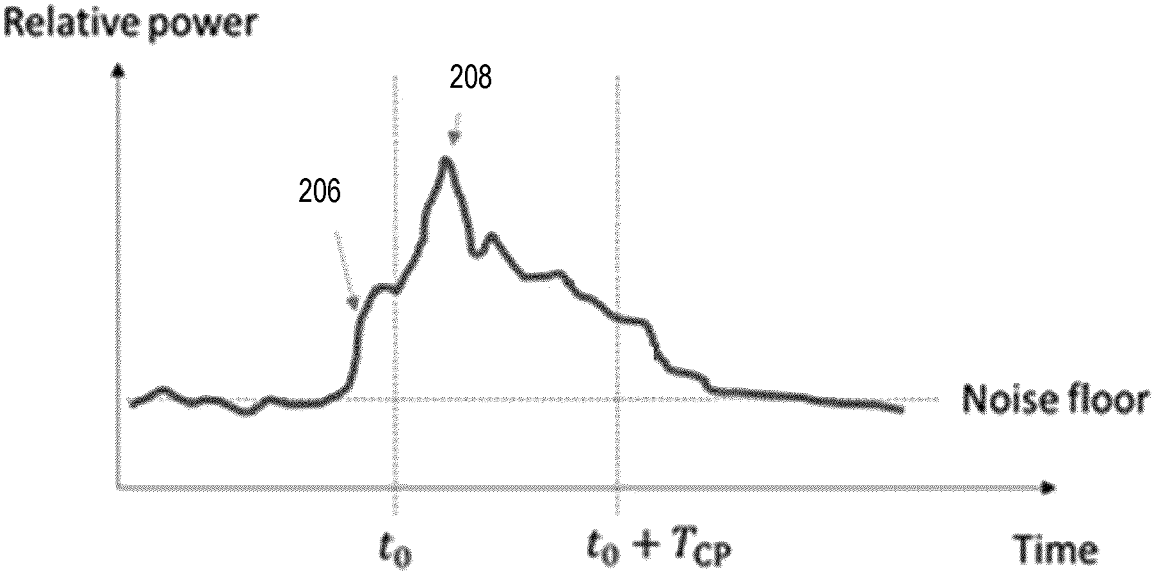

Referring now to FIGS. 2A and 2B, examples of CIR measurement and analysis are provided.

FIG. 2A shows an example of a CIR measured at a UE 102 or node 104. This may be a typical CIR where the first path 202 is correctly included within the cyclic prefix (e.g., between $t_0$ and $t_0+T_{CP}$ in this example). Specifically. FIG. 2A shows an NLOS impulse response where at the start of the impulse response, the first arriving path 202 falls within the FFT window, followed by the strongest multipath 204. An NLOS link would be correctly detected as the first peak 202 that falls within the FFT window in FIG. 2A. However. FIG. 2B shows a CIR where the first path 206 is missed due to improper placement of the FFT window. In this case, an NLOS channel will be incorrectly detected as an LOS channel based on the strongest peak 208. Specifically. FIG. 2 illustrates an example where a first path is missed, for instance, because it may fall outside of the FFT window. This can happen when an FFT window is placed to capture maximum energy of an impulse response, which is typically the case while placing FFT windows for communication purposes. Higher numerologies can be more prone to such issues as the length of cyclic prefix shrinks while the geometries of scenarios and the corresponding time of arrival delay remain same.

In the example of FIG. 2B, the first-arriving path peak 208 within the FFT window is now also the strongest peak. This is a quality that normally characterize an LOS conditions. Thus, this NLOS channel can be mistaken for an LOS channel. According to embodiments, this problem can be mitigated, for example, by a handshake of CIRs from the gNB and the UE to the LMF. According to embodiments, after having generated the CIR from a received reference signal, the UE can use the generated CIR for making LOS/NLOS detection by itself for UE based positioning. However, the UE can also report the information in CIR to the LMF (e.g., using LPP via the gNB). The UE can also send information on its FFT window placement and any LOS/NLOS detection decision that it has made to the LMF.

Figure 2C:
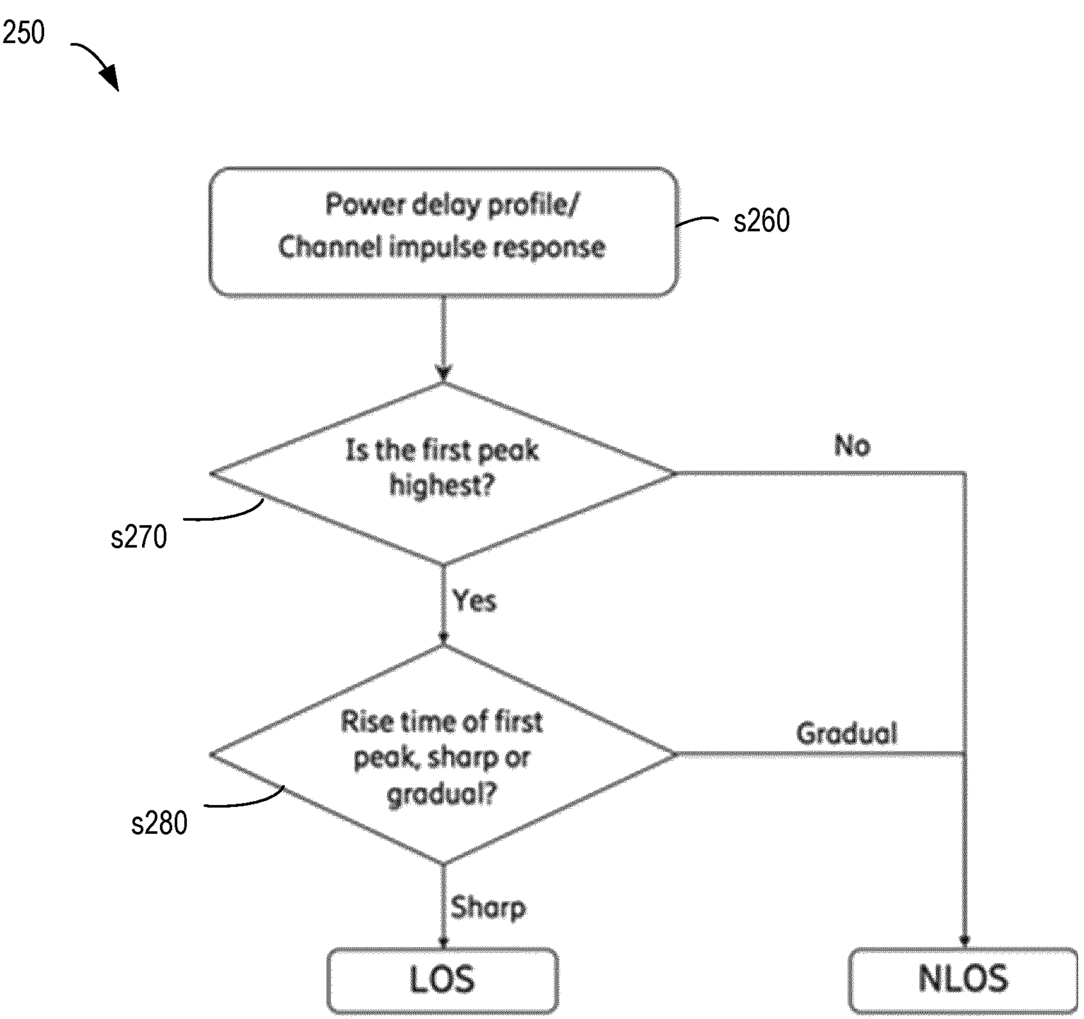
FIG. 2C illustrates an analysis of a power-delay profile for LOS/NLOS detection according to some embodiments.

Referring now to FIG. 2C, a process 250 for LOS/NLOS detection is provided according to some embodiments. With signature-based LOS/NLOS classification, specific signatures (e.g., patterns) are found in the measurements to detect LOS/NLOS. For instance, in an LOS scenario, the highest peak of the measurement may be prominent, and can be identified as the first very clear peak arising from the measurement noise floor. Whereas, in the NLOS case, the highest peak of the measurement data may be more gradual. The nature of LOS peak can be attributed to the fact that in the LOS conditions, all scattered signals arrive after the LOS component of the delay profile. Magnitudes of arriving scattered signals are typically lower than the LOS reception due to higher path losses and other loss attributing effects. In NLOS cases, the highest peak can arrive possibly after many other scattering peaks. Even when the NLOS peak is prominent, typically it may be received after diffuse scattering components. Receiving diffuse scattering components along and before the prominent NLOS peak makes the rise of the peak very gradual. Accordingly. and in some embodiments, one or more of the following may be used in an LOS/NLOS detection process: (i) the LOS peak is the first peak in the power-delay profile of the received signal for an LOS link: (ii) an NLOS peak can also be a first prominent peak in a delay profile: however it appears along with smaller surrounding peaks and other components of delay profile generated from diffusely scattered signal before and after the NLOS prominent peak: (iii) the rise of an LOS highest peak is very sharp, whereas the rise of an NLOS highest peak is very gradual: (iv) a pattern-matching type of NLOS identification method may be especially suitable when a limited number of LOS TRPs are visible to the UE (e.g., when outliers dominate the dataset).

In the LOS/NLOS detection process 250, a power-delay profile or CIR of a received signal is analyzed. In step s260, the power-delay profile or CIR is measured or received. For instance, where process 250 is performed at a UE, the information is measured. However, where the process is performed in the network, for instance by an LMF, the information may be received from a UE and network node. In step s270, it is determined whether the first peak is the highest peak. If no, an NLOS link is detected. If yes, in step 280, it is evaluated whether the rise time of the first peak is sharp or gradual. If gradual, an NLOS link is detected. If sharp, an LOS link is detected. Additionally, and in some embodiments, the determination is reported. In some embodiments, reporting may comprise the location and magnitude of the first peak, the location and magnitude of the highest peak, and/or components of the power-delay profile or CIR around the first/highest peak.

Figure 3:
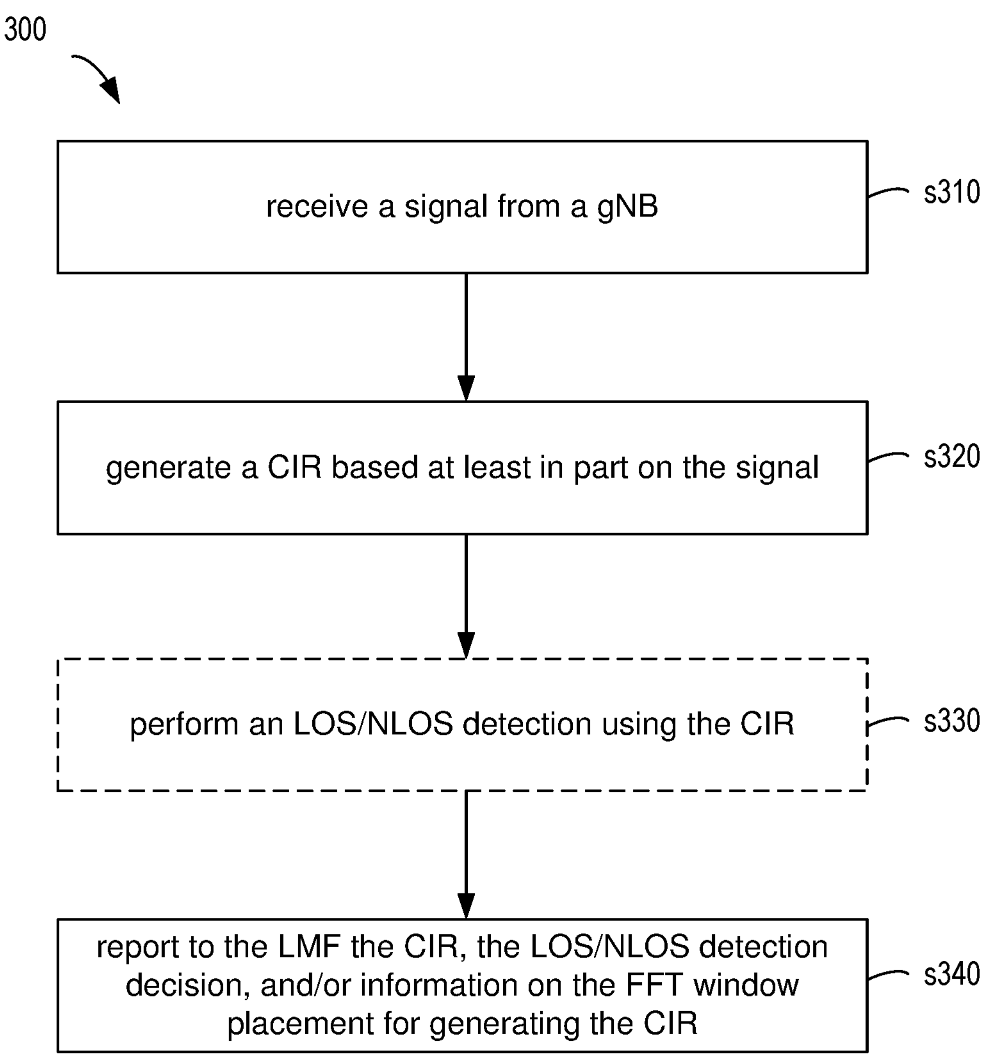
FIG. 3 is a flow chart illustrating processes according to some embodiments.

Referring now to FIG. 3, a process 300 is shown according to embodiments. The process may be performed, for instance, by a device, such as device 102, 612, 700, and/or 1106. In embodiments, the device is a UE. The process may begin with step s310, in which the device (e.g., UE) receives a signal from a node, such as a gNB. The signal may comprise, for example, one or more reference signals. In some embodiments, the reference signals may be timing- or position-measurement specific reference signals. In step s320, the UE generates a CIR based at least in part on the received signal. The CIR may be based on mapping relative power over a given time window. In step s330, which may be optional in some embodiments, the UE performs an LOS/NLOS detection using the CIR. In step s340, the UE reports the CIR to the LMF. The reporting may be, for example, using LPP via the gNB. In some embodiments, the UE may further report the LOS/NLOS detection, and/or information on the FFT window placement for generating the CIR. In some embodiments, the UE comprises a plurality of antennas and a CIR is generated and reported for every resource and antenna pair for a link between then network node (e.g., gNB) and UE. In some embodiments, the CIR is reported as a plurality of power-delay value pairs and/or peak information.

Figure 4:
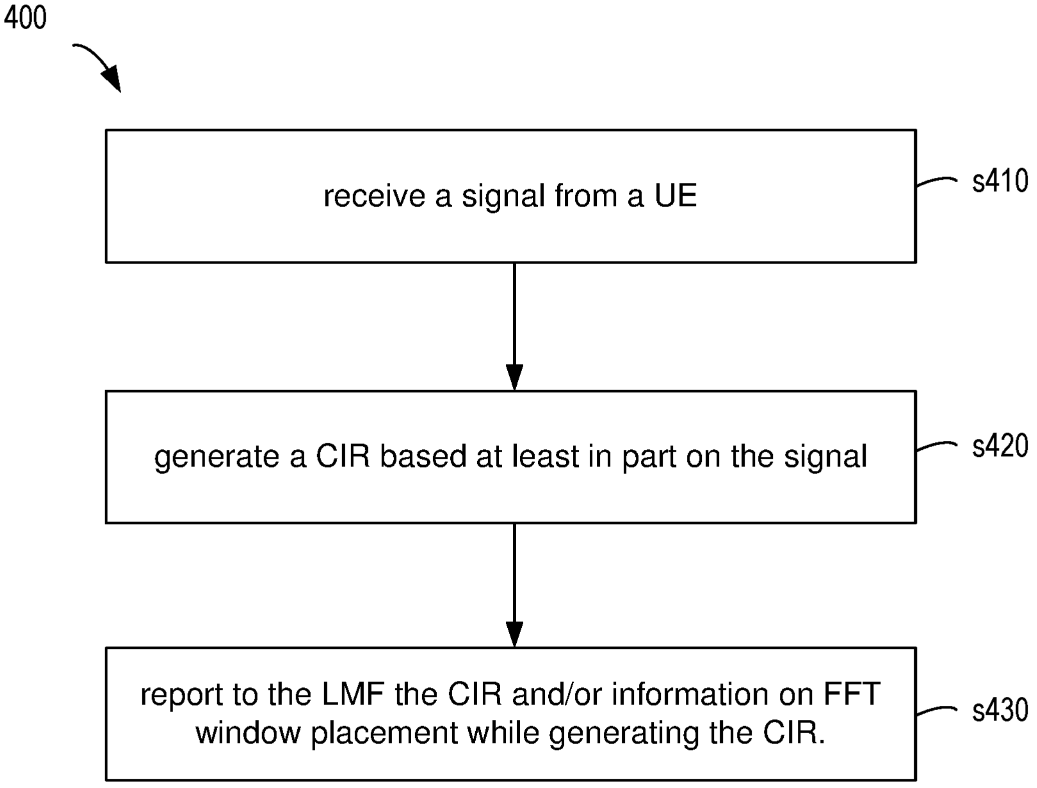
FIG. 4 is a flow chart illustrating processes according to some embodiments.

Referring now to FIG. 4, a process 400 is shown according to embodiments. The process may be performed, for instance, by a network node, such as node 104, 610, 800, or 1104. In embodiments, the network node is a gNB. The process may begin with step s410, in which the node (e.g., gNB) receives a signal from a UE (or other similar device). As with the UE, generic or positioning reference signals may be used. In step s420, the node generates a CIR based at least in part on the received signal. In step s430, the node reports the CIR to the LMF. In some embodiments, the node may further report information on FFT window placement while generating the CIR. In some embodiments, the node sends CIR generated from a received reference signal, and/or information on its FFT window placements, to the LMF, over NRPPa.

In some embodiments, rich reporting from the UE and/or a network node can be utilized, which maximizes the amount of useful information for positioning or measurement evaluation. A detailed reporting of the CIR is beneficial to many algorithms used to establish whether a line of sight link is available For example, there is support for up to two additional paths to be reported with the timing measurements (reference signal time difference (RSTD). UE RxTX Time Diff, gNB RxTx Time Diff and relative time of arrival (RTOA)). According to embodiments, to make rich reporting useful and to meet stringent accuracy requirements, the number of additional paths reported is increased, which can allow for unambiguous definition of what additional paths and what metrics the UE shall report. According to embodiments, rich multipath reporting can include many parameters of the received signal which provides additional information helpful for positioning. Such parameters could include be the magnitudes of peaks, the signal to noise ratios (SNRs) of the peaks. Doppler frequencies, angle of arrival, etc. In certain aspects, rich reporting of one or more of these values may be provided for every reported multipath.

In certain aspects, in order to maximize the utility of reporting of additional paths, embodiments allow a device or node to define unambiguously what additional paths the UE should report. Different paths can be useful for different purposes. For example, the first path gives the TOA of the LOS path in the case of LOS and the TOA closest to the LOS in the case of NLOS. As another example, the strongest path gives information that can be used for LOS detection (e.g., if the first path isn't also the strongest path it could be assumed to be NLOS). Additionally, the strongest path can be measured with high precision, and is useful for fingerprinting techniques. Reporting N strongest paths with shorter delay than the strongest path gives useful information in case the first path is misdetected with noise, interference, or an out of range path. This can also be useful for fingerprinting techniques. A first path can be reported based on lower noise and interference threshold.

According to embodiments, one or more of location and magnitude of the first and additional paths, location and magnitude of the highest peak, and components of the power-delay profile or CIR around first/highest peak are reported. In some embodiments, magnitude, SNR. Doppler frequency, and/or angle of arrival of every path are reported. In some embodiments, it is unambiguously defined what additional paths a UE shall report. In some embodiments, the UE will always report both the first path and the strongest path.

Such information and reporting may be beneficial, for instance, with machine learning (ML) based LOS/NLOS detection. For instance, reporting information of as many peaks as possible may be beneficial. FIG. 12 illustrates the results of a machine learning evaluation according to some embodiments. Here, 10 test cases were evaluated, with an increasing number of reported peaks. For cases 1 to 7, only the highest peaks in the power-delay profile (PDP) were used for LOS/NLOS detection. Peak values and the delay time when the peak occurs were used as ML features, and the number of peaks evaluated was 5, 10, 15, 20, 30, 40 or 50 (Test case 1 to 7). For cases 8 to 10, the measured PDP for the first X number of samples was used, where X=100 (case 8), X=150 (case 9), and all samples in the PDP (case 10). For test cases 8-10, the K-nearest neighbor method was used as it gives the best performance in this example. In FIG. 12, the ML results for test cases 1-10 are shown, where the true LOS/NLOS status of the channel is on the vertical axis, and the ML-estimate is on the horizontal axis. As illustrated in the results of FIG. 12, it can be observed that the ML algorithm can match the channel LOS/NLOS status with very high accuracy. Accordingly, in embodiments, for establishing high accuracy in ML-based LOS/NLOS detection, timing information of as many peaks as possible is reported.

Figure 5A:
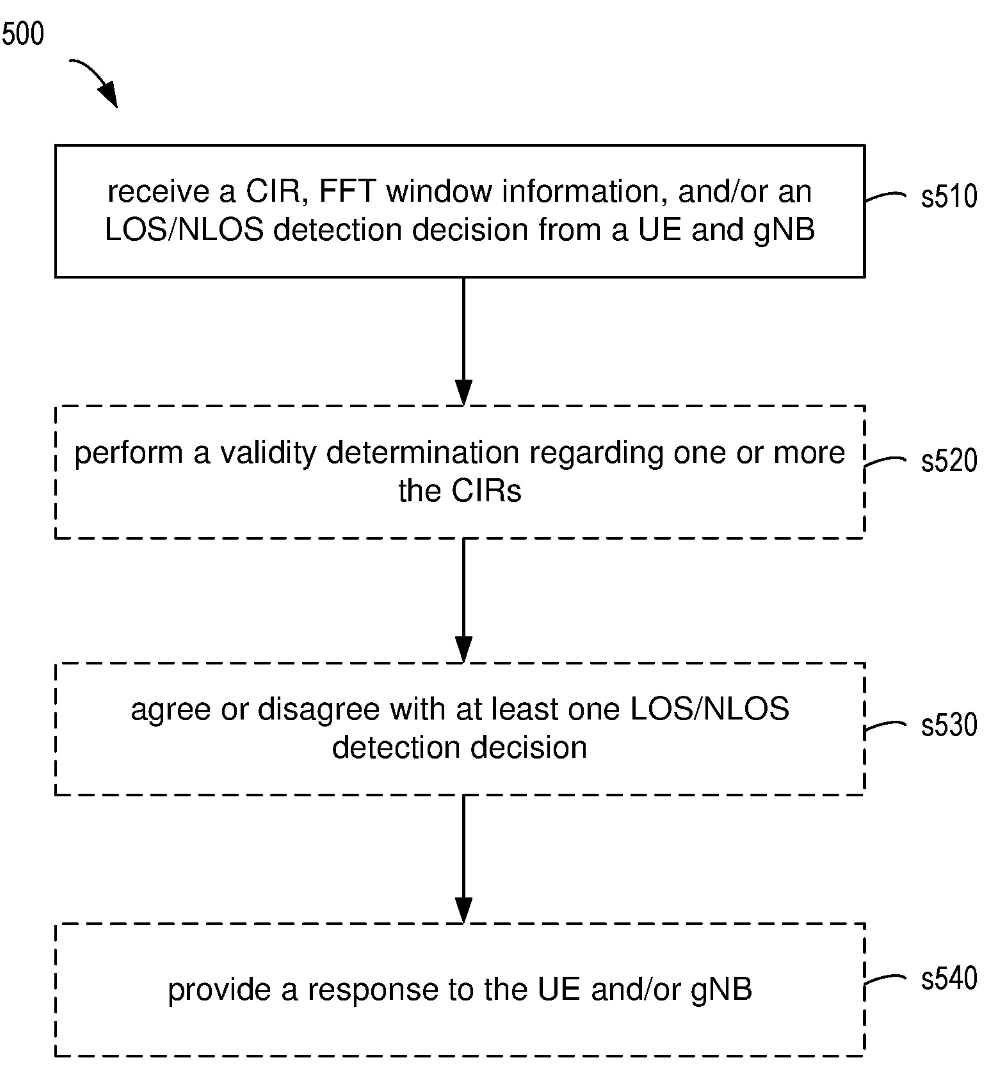
FIGS. 5A and 5B are flow charts illustrating processes according to some embodiments.

Referring now to FIG. 5A, a process 500 is shown according to embodiments. The process may be performed, for instance, in a node, such as node 106, 608, 800. In embodiments, the process is performed by an LMF. This may be for, for example, in a central or core node of a 5G or NR system, including an NG-RAN setup. The process may begin with step s510, in which the node (e.g., an LMF) receives a CIR from at least one UE and at least on gNB. In embodiments, step s510) may also include receiving FFT window information and/or an LOS/NLOS detection decision from one or more of the devices. In step s520, which may be optional in some embodiments, the LMF performs a validity determination regarding one or more of the CIRs. This can be based on the information available to the LMF. In step s530, which may be optional in some embodiments, the LMF makes a determination as to whether it agrees (or disagrees) with the at least one LOS/NLOS detection decision. According to some embodiments, the LMF can evaluate the LOS/NLOS decision made by the UE, if any, based on the CIR received from the corresponding gNB as well. In step s540, which may be optional in some embodiments, the LMF can provide a response to the UE and/or gNB. The response may indicate the validity determination and/or the node's agreement/disagreement with the LOS/NLOS determination. In some embodiments, the LMF can take the final decision on the NLOS/LOS nature of the link and convey it to the UE (if required). In some embodiments, the LMF provides an FFT window shift in time to the UE or gNB. In certain aspects, the LMF can evaluate whether the FFT window placements by the UE and gNB are optimal for time of arrival estimation. This may ensure, for instance, that the first path is not missed.

According to embodiments, the LMF may perform one or more location/positioning functions with respect to the UE.

In some embodiments (e.g., with respect to FIGS. 5A and 5B), the functionality of the LMF may be incorporated into a network node such as a gNB. In some embodiments, the functionality of the LMF may be distributed.

According to embodiments, the LMF can direct or provide configuration details to the UE and gNBs to shift their FFT window placements based on the obtained CIR information. In one example, the LMF obtains CIR information from one or more gNBs in relation to a specific UE, and CIR from the particular UE. Based on the combined CIR information the LMF shifts the FFT window configuration of the UE.

According to embodiments, the information received by the node (e.g., LMF) in process 500 is generated and sent from the UE and gNB according to processes 300 and/or 400 as described with respect to FIGS. 3 and 4.

According to some embodiments, the LMF receives CIRs from the UE and multiple gNBs.

In some embodiments, an LMF checks the correlation of the CIRs from the gNBs and the UE. This may be, for instance, to validate if the UE and the corresponding gNB's interpretation of the channel is nearly identical. From the reciprocity principle, there should be high correlation between the UE and a gNB's CIR. In certain aspects, this may be performed in connection with step s520) and/or step s530. In some embodiments, the LMF can establish the levels of reciprocity between the gNBs and the UE.

In some embodiments, UEs and gNBs can send CIRs for every resource and antenna pair. In this example, the LMF may be able to make a better decision from these different combinations indicating an LOS/NLOS link.

In some embodiments, the LMF learns (e.g., is notified of) the method that the UE uses for LOS/NLOS detection. For example, if the UE makes the detection using something other than CIRs, the LMF can weigh its decision on LOS/NLOS detection accordingly. For instance, and in some embodiments, an LMF may be less likely to override a detection decision by the UE where the UE used a method other than CIR analysis for its determination. Accordingly, in some embodiments, UEs and gNBs indicate the method they are using to detect the LOS/NLOS nature of the links to the LMF Referring now to FIG. 5B, a process 550 is provided according to embodiments. The process may be performed, for instance, in a node, such as node 106, 608, 800. In embodiments, the process is performed by an LMF. This may be for, for example, in a central or core node of a 5G or NR system, including an NG-RAN setup.

The process may begin with step s551, in which the node (e.g., comprising an LMF) receives CIR information from a device and network node, such as a UE and gNB. The received CIR information may include, for example, one or more of peak power, peak location, or a power-delay array or set of values. For instance, the received information may be the full CIR power-delay profile measured by a given device, or a plurality of power-delay value pairs associated with peak locations in the CIR. In certain aspects, the first CIR information is received form the device using LPP, the second CIR information is received from the network node using NRPPa, the response is provided to the device using LPP, and/or the response is provided to the network node using NRPPa. In some embodiments, the first CIR information for the device is received from a plurality of nodes, and one or more subsequent steps (e.g., one or more of comparing, evaluating, and/or validating) is based on the information received from the plurality of nodes. Additionally, the device or node may have a plurality of antennas, and the first CIR information can thus comprise CIR information corresponding to a plurality of receive beams of a given device (e.g., the UE).

In step s552, which may be optional in some embodiments, the node also receives FFT window information and/or an LOS/NLOS detection decision from at least one of the UE or gNB.

In step s553, the node performs a comparison of the received channel information. For example, and in some embodiments, the node can receive first CIR information for a device and second CIR information for a network node, and then perform a comparison of the received first and second CIR information. In some embodiments, comparing the first and second CIR information comprises comparing peak ordering between the first and second CIR information. For example, the peak ordering in one CIR may be "strongest," "second strongest," "weakest," but in another CIR it is "weakest," "second weakest," "strongest." This could indicate that there is a discrepancy and that the measurements/data and/or LOS/NLOS determination(s) are not reliable.

In step s554, the node evaluates the reliability of the received channel information or a related positional determination for the UE. For instance, the node may perform one or more of: (i) evaluating the reliability of the received first or second CIR information based at least in part on the comparison, (ii) evaluating the reliability of a position determination for the device based at least in part on the comparison, (iii) evaluating the reliability of the LOS/NLOS detection decision by the device or network node based at least in part on the comparison, and/or (iv) evaluating a CIR measurement window placement of the device or network node based at least in part on the comparison. In certain aspects, evaluating the reliability of the LOS/NLOS detection decision can include validating the decision. This could include, for instance, where the validation is based on a correlation of the CIR information from the device and network node, or the validation is based on whether an FFT window placement by the device or network node is acceptable for time of arrival estimation. The validation may also be based on the technique used by the device for LOS/NLOS detection.

In step s555, which also may be optional in some embodiments, the node provides a response to the UE and/or gNB based at least in part on the comparison. The response may comprise, for example, setting a flag and/or communicating a flag to one or more of the UE and/or gNB. According to embodiments, the response indicates one or more of: (i) the validity of an LOS/NLOS determination made by the device or network node, (ii) a new measurement window configuration for LOS/NLOS measurements at the device or network node (e.g., an FFT window parameter for CIR measurements, or an adjustment to timing advance), (iii) a value indicative of the level of correlation between the first and second CIR information, (iv) a reliability metric for LOS/NLOS determinations or CIR measurements at the device or network node, and/or (v) an override of an LOS/NLOS determination made by the device or network node. In some embodiments, the reliability metric is a quantitative assessment of how well the CIRs are correlated to each other.

In certain aspects, it is the LMF that makes the final decision as to LOS/NLOS decisions and communicates them to other entities (e.g., via a flag). For instance, it can send the final determination back to the UE (e.g., where positioning is UE-based) vial LPP and back to the network node (e.g., where positioning is network based) via NPRRa. In some embodiments, the flag may indicate the LMF's validity determination and/or its agreement or disagreement with an LOS/NLOS determination made by the device or network node.

In some embodiments, the process 550) includes performing one or more location or positioning functions (e.g., in the LMF). This can be based at least in part on the received CIR information or the comparison. In this respect, the functionality of the LMF or other location/positioning node can be improved through the fusion of information received from multiple sources.

Figure 5B:
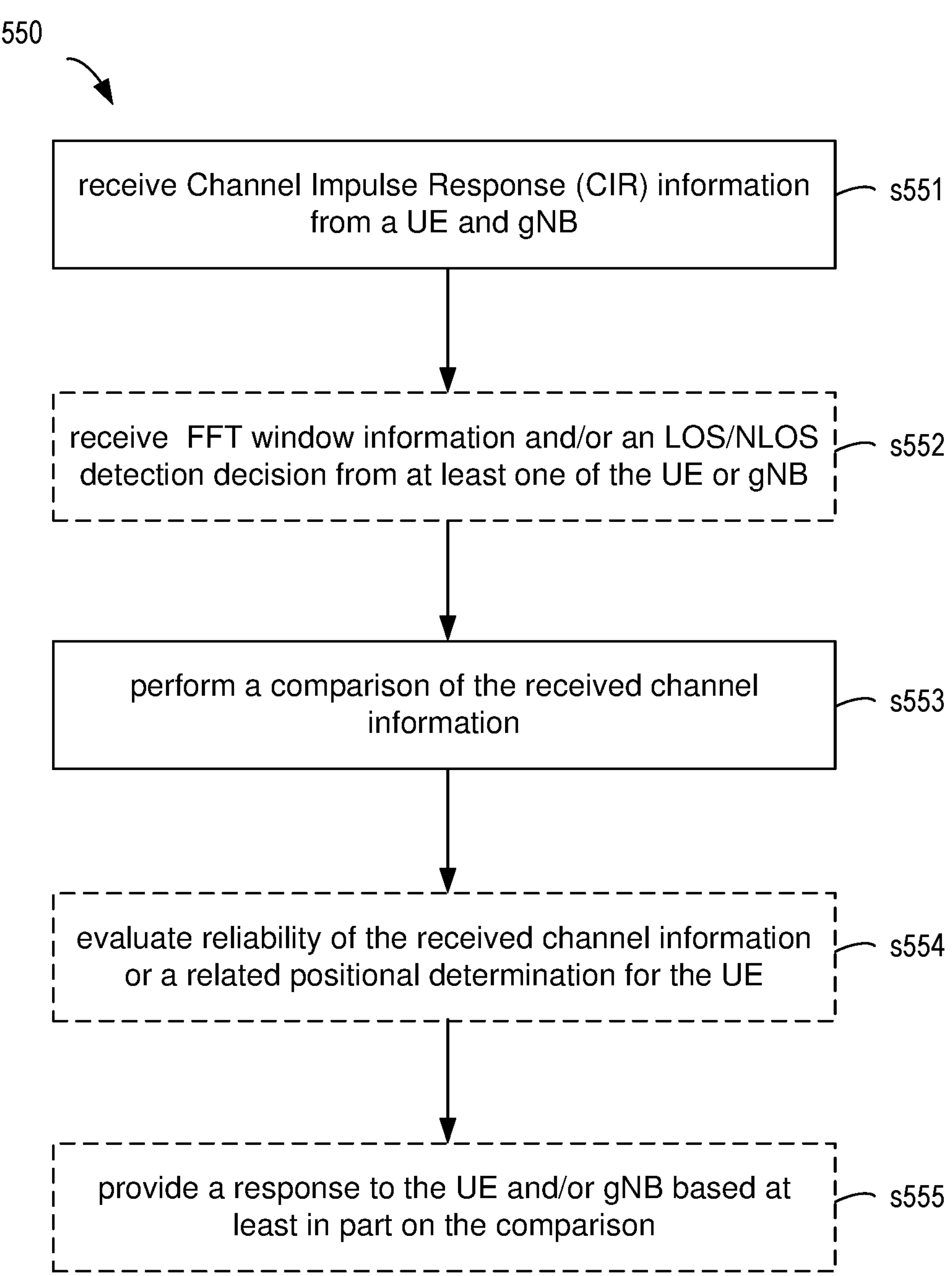

Although described with respect to FIG. 5B, the steps of process 550 may also be performed in the context of FIG. 5A and process 500 according to embodiments.

According to some embodiments, such as processes 500 and 550, a node (e.g., comprising LMF functionality in this example) may perform one or more of the following: (i) an LMF validates LOS/NLOS decisions of a link from reported CIRs from the gNBs and the UE; (ii) an LMF reports any discrepancy in the CIRs from the gNBs and the UE: (iii) an LMF determines reliability of the channel and position estimation based on the reported CIRs: (iv) an LMF may be, in some example, the final authority on deciding a LOS/NLOS nature of the link; (v) an LMF sets different threshold levels to decide a level of coherence of CIR estimation at UE and gNB end: (vi) an LMF decides the stability of the channel between the UE and the gNB (e.g., based at least in part on the received CIR); (vii) an LMF can use different decision fusion strategies to fuse measurements and decisions from UE and gNBs; and (viii) an LMF redistributes the corrected and improved CIRs to the UEs via LPP for use in UE based positioning.

Additionally, an LMF may suggest (or require that) a UE adjust its FFT window placement for better time of arrival estimation. In one example of the embodiment, the LMF obtains CIR information from one or more gNBs in relation to a specific UE, and CIR from the particular UE. Based on the combined CIR information, the LMF shifts the FFT window configuration of the UE. In certain aspects, the FFT window location can be derived based on an expected relative time of arrival between two signals. In this case, the UE obtains one or more expected relative time of arrival information from the LMF to determine a suitable FFT window. If the LMF desires to shift the FFT window of the UE, the LMF alters one or more of the expected relative time of arrival information to the UE. In some embodiments, an LMF recognizes that the UE estimated CIR and the gNB estimated CIR are well matched in a certain segment. The LMF can then extrapolate the UE estimated CIR outside its FFT window using the gNB estimated CIR, or vice versa.

Information and configurations sent by the LMF or other node may be received by the device (e.g., UE) or network node (e.g., gNB) as a step of processes 300 and 400 as described with respect to FIG. 3 and FIG. 4, respectively. The device or network node may then respond accordingly, for instance, by adjusting a configuration or measurement technique, or by changing a channel determination (e.g., an LOS/NLOS determination) upon receipt. In some embodiments, the received information and configurations are used by the device or network node for subsequent measurements, reporting, and/or determinations. For example, one or more steps described with respect to processes 300 and 400 may be repeated with a new configuration. The UE or network node may respond accordingly to the received information, for example, when the response from the LMF indicates one or more of: (i) the validity of an LOS/NLOS determination made by the user equipment (e.g., by re-measuring and evaluating the channel for LOS/NLOS), (ii) a new FFT window configuration (e.g., by adjusting the window placement), (iii) an indication of discrepancy between CIR information reported from the network node and reported by the user equipment (e.g., by re-measuring the CIR), (iv) a reliability metric for LOS/NLOS determinations or CIR measurements made by the user equipment (by adjusting one or more measurement parameters or techniques), and/or (v) an override of an LOS/NLOS determination made by the user equipment (e.g., by changing a stored determination).

Figure 6:
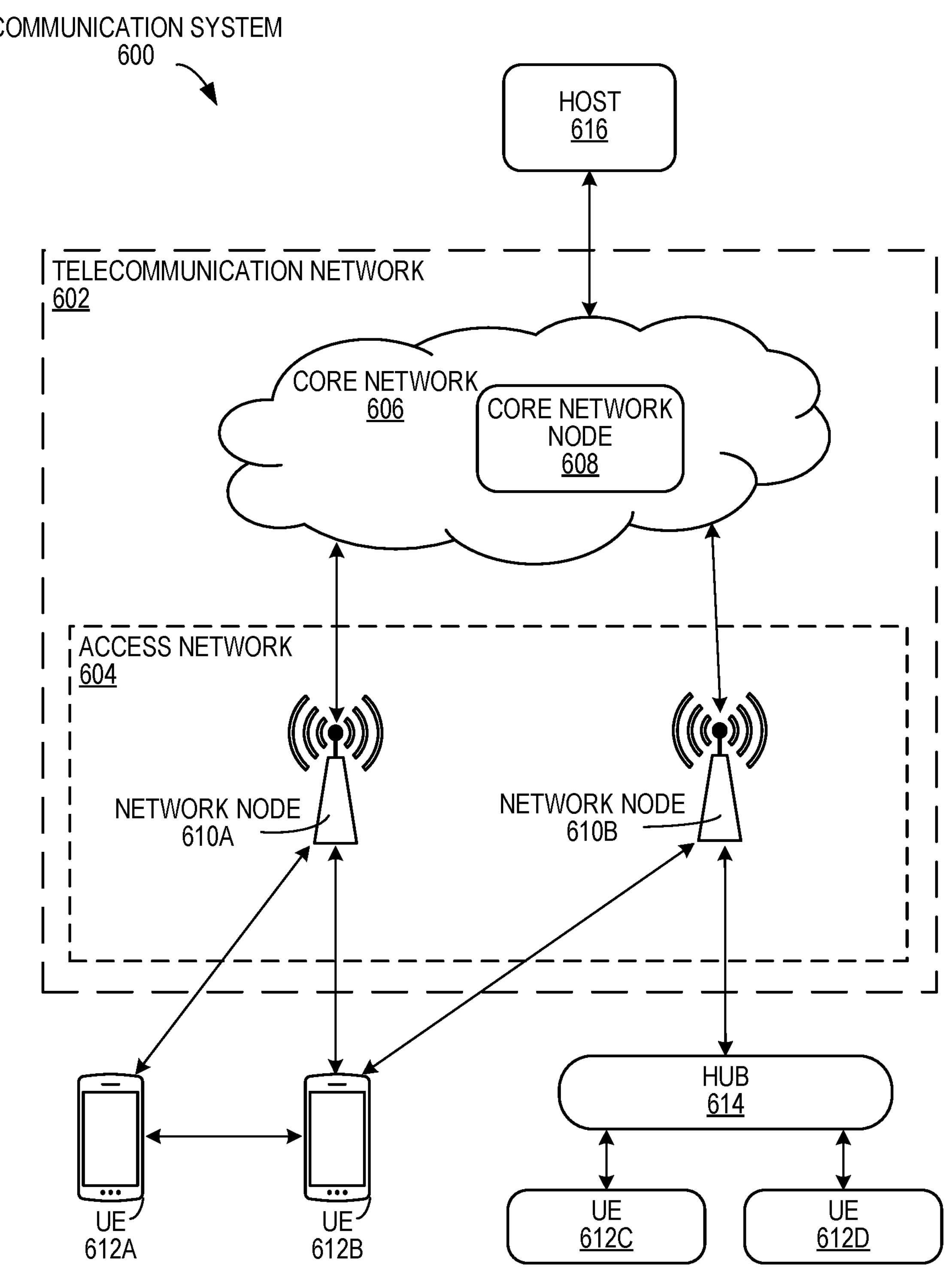
FIG. 6 illustrates a system according to embodiments.

FIG. 6 shows an example of a communication system 600 in accordance with some embodiments.

In the example, the communication system 600 includes a telecommunication network 602 that includes an access network 604, such as a radio access network (RAN), and a core network 606, which includes one or more core network nodes 608. The access network 604 includes one or more access network nodes, such as network nodes 610*a* and 610*b* (one or more of which may be generally referred to as network nodes 610), or any other similar 3$^{rd}$ Generation Partnership Project (3GPP) access node or non-3GPP access point. The network nodes 610 facilitate direct or indirect connection of user equipment (UE), such as by connecting UEs 612*a*, 612*b*, 612*c*, and 612*d* (one or more of which may be generally referred to as UEs 612) to the core network 606 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 600 may include any number of wired or wireless networks, network nodes, UEs, and/or any other components or systems that may facilitate or participate in the communication of data and/or signals whether via wired or wireless connections. The communication system 600 may include and/or interface with any type of communication, telecommunication, data, cellular, radio network, and/or other similar type of system.

The UEs 612 may be any of a wide variety of communication devices, including wireless devices arranged, configured, and/or operable to communicate wirelessly with the network nodes 610) and other communication devices. Similarly, the network nodes 610 are arranged, capable, configured, and/or operable to communicate directly or indirectly with the UEs 612 and/or with other network nodes or equipment in the telecommunication network 602 to enable and/or provide network access, such as wireless network access, and/or to perform other functions, such as administration in the telecommunication network 602.

In the depicted example, the core network 606 connects the network nodes 610 to one or more hosts, such as host 616. These connections may be direct or indirect via one or more intermediary networks or devices. In other examples, network nodes may be directly coupled to hosts. The core network 606 includes one more core network nodes (e.g., core network node 608) that are structured with hardware and software components. Features of these components may be substantially similar to those described with respect to the UEs, network nodes, and/or hosts, such that the descriptions thereof are generally applicable to the corresponding components of the core network node 608. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF). In certain aspects, a core network node includes the functions of a Location Management Function (LMF).

The host 616 may be under the ownership or control of a service provider other than an operator or provider of the access network 604 and/or the telecommunication network 602, and may be operated by the service provider or on behalf of the service provider. The host 616 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 600 of FIG. 6 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 602 is a cellular network that implements 3GPP standardized features. Accordingly, the telecommunications network 602 may support network slicing to provide different logical networks to different devices that are connected to the telecommunication network 602. For example, the telecommunications network 602 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 612 are configured to transmit and/or receive information without direct human interaction. For instance, a UE may be designed to transmit information to the access network 604 on a predetermined schedule, when triggered by an internal or external event, or in response to requests from the access network 604. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 614 communicates with the access network 604 to facilitate indirect communication between one or more UEs (e.g., UE 612*c* and/or 612*d*) and network nodes (e.g., network node 610*b*). In some examples, the hub 614 may be a controller, router, content source and analytics, or any of the other communication devices described herein regarding UEs. For example, the hub 614 may be a broadband router enabling access to the core network 606 for the UEs. As another example, the hub 614 may be a controller that sends commands or instructions to one or more actuators in the UEs. Commands or instructions may be received from the UEs, network nodes 610, or by executable code, script, process, or other instructions in the hub 614. As another example, the hub 614 may be a data collector that acts as temporary storage for UE data and, in some embodiments, may perform analysis or other processing of the data. As another example, the hub 614 may be a content source. For example, for a UE that is a VR headset, display, loudspeaker or other media delivery device, the hub 614 may retrieve VR assets, video, audio, or other media or data related to sensory information via a network node, which the hub 614 then provides to the UE either directly, after performing local processing, and/or after adding additional local content. In still another example, the hub 614 acts as a proxy server or orchestrator for the UEs, in particular in if one or more of the UEs are low energy IoT devices.

The hub 614 may have a constant/persistent or intermittent connection to the network node 610*b*. The hub 614 may also allow for a different communication scheme and/or schedule between the hub 614 and UEs (e.g., UE 612*c* and/or 612*d*), and between the hub 614 and the core network 606. In other examples, the hub 614 is connected to the core network 606 and/or one or more UEs via a wired connection. Moreover, the hub 614 may be configured to connect to an M2M service provider over the access network 604 and/or to another UE over a direct connection. In some scenarios, UEs may establish a wireless connection with the network nodes 610 while still connected via the hub 614 via a wired or wireless connection. In some embodiments, the hub 614 may be a dedicated hub—that is, a hub whose primary function is to route communications to/from the UEs from/to the network node 610*b*. In other embodiments, the hub 614 may be a non-dedicated hub—that is, a device which is capable of operating to route communications between the UEs and network node 610*b*, but which is additionally capable of operating as a communication start and/or end point for certain data channels.

Figure 7:
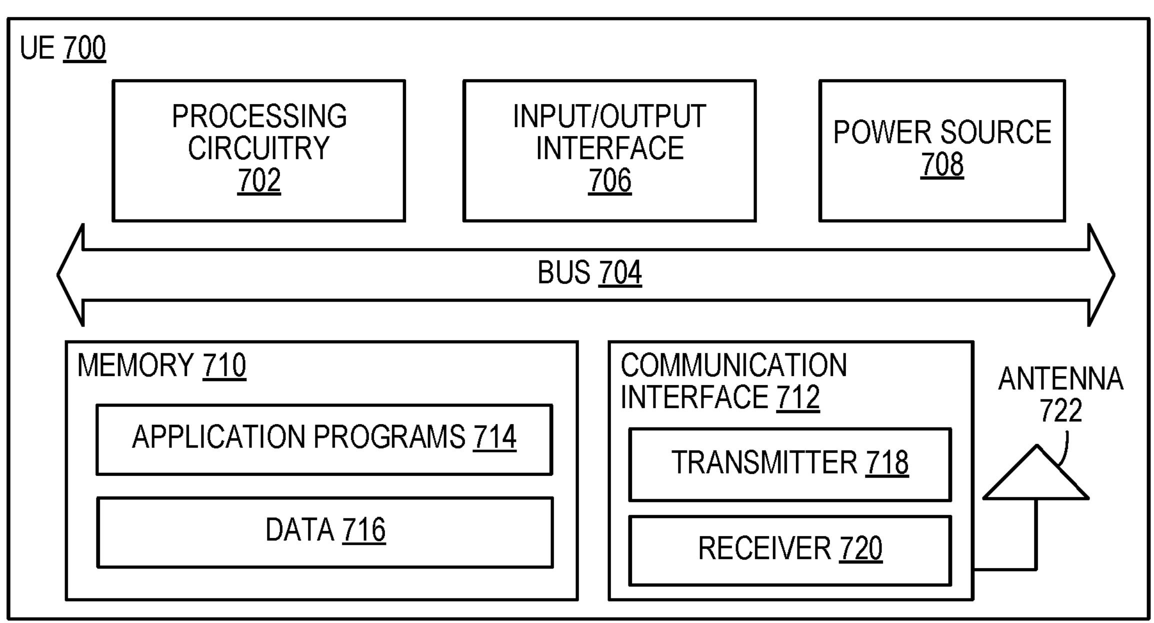
FIG. 7 illustrates a device according to embodiments.

FIG. 7 shows a UE 700 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 700 includes processing circuitry 702 that is operatively coupled via a bus 704 to an input/output interface 706, a power source 708, a memory 710, a communication interface 712, and/or any other component, or any combination thereof. Certain UEs may utilize all or a subset of the components shown in FIG. 7. The level of integration between the components may vary from one UE to another UE. Further, certain UEs may contain multiple instances of a component, such as multiple processors, memories, transceivers, transmitters, receivers, etc.

The processing circuitry 702 is configured to process instructions and data and may be configured to implement any sequential state machine operative to execute instructions stored as machine-readable computer programs in the memory 710. The processing circuitry 702 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 702 may include multiple central processing units (CPUs).

In the example, the input/output interface 706 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 700. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 708 is structured as a battery or battery pack. Other types of power sources, such as an external power source (e.g., an electricity outlet), photovoltaic device, or power cell, may be used. The power source 708 may further include power circuitry for delivering power from the power source 708 itself, and/or an external power source, to the various parts of the UE 700 via input circuitry or an interface such as an electrical power cable. Delivering power may be, for example, for charging of the power source 708. Power circuitry may perform any formatting, converting, or other modification to the power from the power source 708 to make the power suitable for the respective components of the UE 700 to which power is supplied.

The memory 710 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 710) includes one or more application programs 714, such as an operating system, web browser application, a widget, gadget engine, or other application, and corresponding data 716. The memory 710 may store, for use by the UE 700, any of a variety of various operating systems or combinations of operating systems.

The memory 710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 710 may allow the UE 700 to access instructions, application programs and the like, stored on transitory or non-transitory memory media, to off-load data, or to upload data. An article of manufacture, such as one utilizing a communication system may be tangibly embodied as or in the memory 710, which may be or comprise a device-readable storage medium.

The processing circuitry 702 may be configured to communicate with an access network or other network using the communication interface 712. The communication interface 712 may comprise one or more communication subsystems and may include or be communicatively coupled to an antenna 722. The communication interface 712 may include one or more transceivers used to communicate, such as by communicating with one or more remote transceivers of another device capable of wireless communication (e.g., another UE or a network node in an access network). Each transceiver may include a transmitter 718 and/or a receiver 720 appropriate to provide network communications (e.g., optical, electrical, frequency allocations, and so forth). Moreover, the transmitter 718 and receiver 720 may be coupled to one or more antennas (e.g., antenna 722) and may share circuit components, software or firmware, or alternatively be implemented separately.

In the illustrated embodiment, communication functions of the communication interface 712 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 700 shown in FIG. 7.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 8:
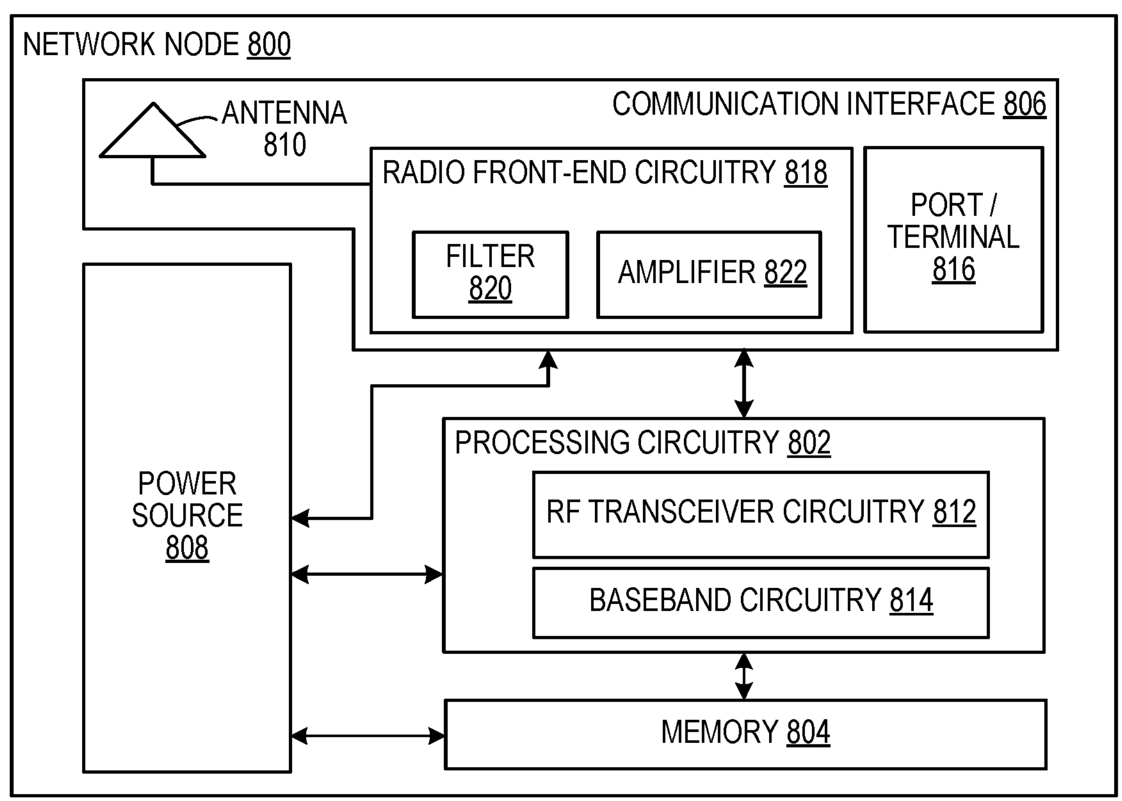
FIG. 8 illustrates a network node according to embodiments.

FIG. 8 shows a network node 800 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 800 includes a processing circuitry 802, a memory 804, a communication interface 806, and a power source 808. The network node 800 may be composed of multiple physically separate components (e.g., a NodeB component and a RNC component, or a BTS component and a BSC component, etc.), which may each have their own respective components. In certain scenarios in which the network node 800 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 800 may be configured to support multiple radio access technologies (RATs). In such embodiments, some components may be duplicated (e.g., separate memory 804 for different RATs) and some components may be reused (e.g., a same antenna 810) may be shared by different RATs). The network node 800 may also include multiple sets of the various illustrated components for different wireless technologies integrated into network node 800, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 800.

The processing circuitry 802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 800 components, such as the memory 804, to provide network node 800 functionality.

In some embodiments, the processing circuitry 802 includes a system on a chip (SOC). In some embodiments, the processing circuitry 802 includes one or more of radio frequency (RF) transceiver circuitry 812 and baseband processing circuitry 814. In some embodiments, the radio frequency (RF) transceiver circuitry 812 and the baseband processing circuitry 814 may be on separate chips (or sets of chips), boards, or units, such as radio units and digital units. In alternative embodiments, part or all of RF transceiver circuitry 812 and baseband processing circuitry 814 may be on the same chip or set of chips, boards, or units.

The memory 804 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 802. The memory 804 may store any suitable instructions, data, or information, including a computer program, software, an application including one or more of logic, rules, code, tables, and/or other instructions capable of being executed by the processing circuitry 802 and utilized by the network node 800. The memory 804 may be used to store any calculations made by the processing circuitry 802 and/or any data received via the communication interface 806. In some embodiments, the processing circuitry 802 and memory 804 is integrated.

The communication interface 806 is used in wired or wireless communication of signaling and/or data between a network node, access network, and/or UE. As illustrated, the communication interface 806 comprises port(s)/terminal(s) 816 to send and receive data, for example to and from a network over a wired connection. The communication interface 806 also includes radio front-end circuitry 818 that may be coupled to, or in certain embodiments a part of, the antenna 810. Radio front-end circuitry 818 comprises filters 820 and amplifiers 822. The radio front-end circuitry 818 may be connected to an antenna 810 and processing circuitry 802. The radio front-end circuitry may be configured to condition signals communicated between antenna 810 and processing circuitry 802. The radio front-end circuitry 818 may receive digital data that is to be sent out to other network nodes or UEs via a wireless connection. The radio front-end circuitry 818 may convert the digital data into a radio signal having the appropriate channel and bandwidth parameters using a combination of filters 820 and/or amplifiers 822. The radio signal may then be transmitted via the antenna 810. Similarly, when receiving data, the antenna 810 may collect radio signals which are then converted into digital data by the radio front-end circuitry 818. The digital data may be passed to the processing circuitry 802. In other embodiments, the communication interface may comprise different components and/or different combinations of components.

In certain alternative embodiments, the network node 800 does not include separate radio front-end circuitry 818, instead, the processing circuitry 802 includes radio front-end circuitry and is connected to the antenna 810. Similarly, in some embodiments, all or some of the RF transceiver circuitry 812 is part of the communication interface 806. In still other embodiments, the communication interface 806 includes one or more ports or terminals 816, the radio front-end circuitry 818, and the RF transceiver circuitry 812, as part of a radio unit (not shown), and the communication interface 806 communicates with the baseband processing circuitry 814, which is part of a digital unit (not shown).

The antenna 810 may include one or more antennas, or antenna arrays, configured to send and/or receive wireless signals. The antenna 810 may be coupled to the radio front-end circuitry 818 and may be any type of antenna capable of transmitting and receiving data and/or signals wirelessly. In certain embodiments, the antenna 810 is separate from the network node 800 and connectable to the network node 800 through an interface or port.

The antenna 810, communication interface 806, and/or the processing circuitry 802 may be configured to perform any receiving operations and/or certain obtaining operations described herein as being performed by the network node. Any information, data and/or signals may be received from a UE, another network node and/or any other network equipment. Similarly, the antenna 810, the communication interface 806, and/or the processing circuitry 802 may be configured to perform any transmitting operations described herein as being performed by the network node. Any information, data and/or signals may be transmitted to a UE, another network node and/or any other network equipment.

The power source 808 provides power to the various components of network node 800 in a form suitable for the respective components (e.g., at a voltage and current level needed for each respective component). The power source 808 may further comprise, or be coupled to, power management circuitry to supply the components of the network node 800 with power for performing the functionality described herein. For example, the network node 800 may be connectable to an external power source (e.g., the power grid, an electricity outlet) via an input circuitry or interface such as an electrical cable, whereby the external power source supplies power to power circuitry of the power source 808. As a further example, the power source 808 may comprise a source of power in the form of a battery or battery pack which is connected to, or integrated in, power circuitry. The battery may provide backup power should the external power source fail.

Embodiments of the network node 800 may include additional components beyond those shown in FIG. 8 for providing certain aspects of the network node's functionality, including any of the functionality described herein and/or any functionality necessary to support the subject matter described herein. For example, the network node 800 may include user interface equipment to allow input of information into the network node 800 and to allow output of information from the network node 800. This may allow a user to perform diagnostic, maintenance, repair, and other administrative functions for the network node 800.

Figure 9:
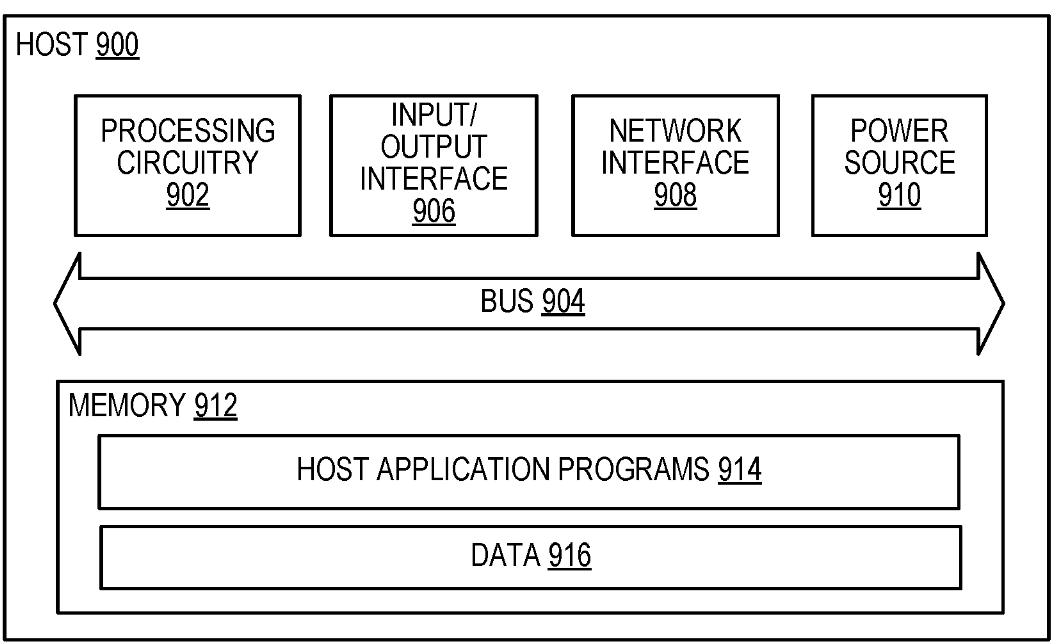
FIG. 9 is a schematic diagram of a host according to embodiments.

FIG. 9 is a block diagram of a host 900, which may be an embodiment of the host 616 of FIG. 6, in accordance with various aspects described herein. As used herein, the host 900 may be or comprise various combinations hardware and/or software, including a standalone server, a blade server, a cloud-implemented server, a distributed server, a virtual machine, container, or processing resources in a server farm. The host 900 may provide one or more services to one or more UEs.

The host 900 includes processing circuitry 902 that is operatively coupled via a bus 904 to an input/output interface 906, a network interface 908, a power source 910, and a memory 912. Other components may be included in other embodiments. Features of these components may be substantially similar to those described with respect to the devices of previous figures, such as FIGS. 7 and 8, such that the descriptions thereof are generally applicable to the corresponding components of host 900.

The memory 912 may include one or more computer programs including one or more host application programs 914 and data 916, which may include user data, e.g., data generated by a UE for the host 900 or data generated by the host 900 for a UE. Embodiments of the host 900 may utilize only a subset or all of the components shown. The host application programs 914 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 914 may also provide for user authentication and licensing checks and may periodically report health, routes, and content availability to a central node, such as a device in or on the edge of a core network. Accordingly, the host 900 may select and/or indicate a different host for over-the-top services for a UE. The host application programs 914 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 10:
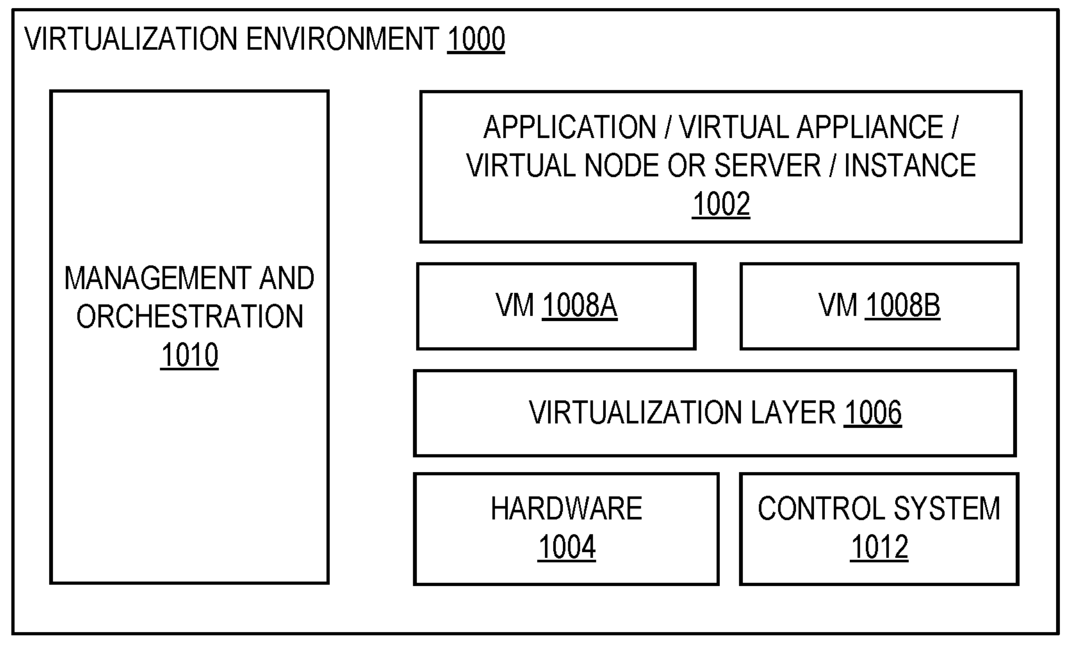
FIG. 10 is a schematic diagram of a virtualization environment according to embodiments.

FIG. 10 is a block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1000 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1002 (which may alternatively be called software instances, virtual appliances, network functions, virtual nodes, virtual network functions, etc.) are run in the virtualization environment 1000 to implement some of the features, functions, and/or benefits of some of the embodiments disclosed herein.

Hardware 1004 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1006 (also referred to as hypervisors or virtual machine monitors (VMMs)), provide VMs 1008*a* and 1008*b* (one or more of which may be generally referred to as VMs 1008), and/or perform any of the functions, features and/or benefits described in relation with some embodiments described herein. The virtualization layer 1006 may present a virtual operating platform that appears like networking hardware to the VMs 1008.

The VMs 1008 comprise virtual processing, virtual memory, virtual networking or interface and virtual storage, and may be run by a corresponding virtualization layer 1006. Different embodiments of the instance of a virtual appliance 1002 may be implemented on one or more of VMs 1008, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1008 may be a software implementation of a physical machine that runs programs as if they were executing on a physical, non-virtualized machine. Each of the VMs 1008, and that part of hardware 1004 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1008 on top of the hardware 1004 and corresponds to the application 1002.

Hardware 1004 may be implemented in a standalone network node with generic or specific components. Hardware 1004 may implement some functions via virtualization. Alternatively, hardware 1004 may be part of a larger cluster of hardware (e.g. such as in a data center or CPE) where many hardware nodes work together and are managed via management and orchestration 1010, which, among others, oversees lifecycle management of applications 1002. In some embodiments, hardware 1004 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1012 which may alternatively be used for communication between hardware nodes and radio units.

Figure 11:
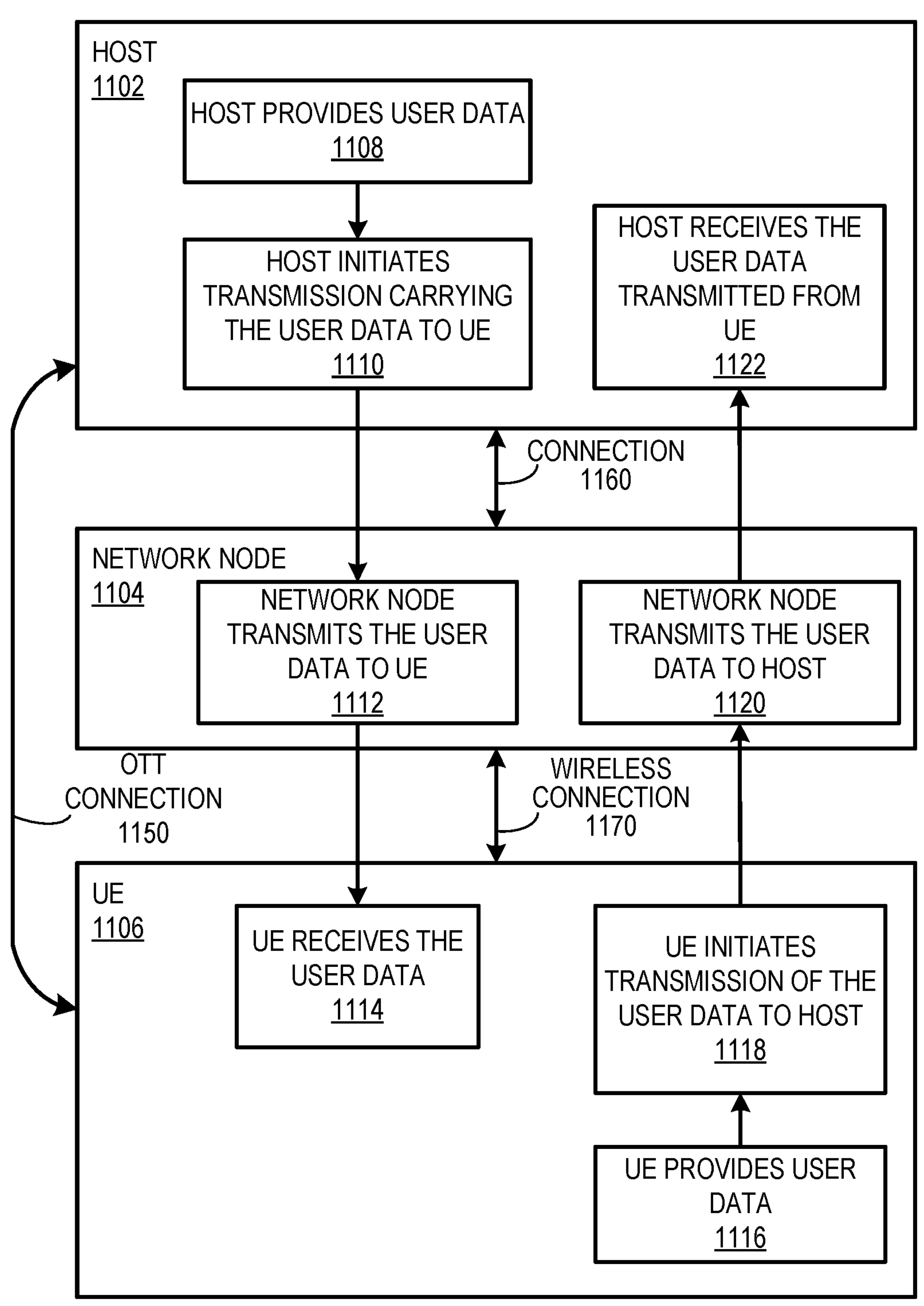
FIG. 11 is a communication diagram according to embodiments.

FIG. 11 shows a communication diagram of a host 1102 communicating via a network node 1104 with a UE 1106 over a partially wireless connection in accordance with some embodiments. Example implementations, in accordance with various embodiments, of the UE (such as a UE 612*a* of FIG. 6 and/or UE 700 of FIG. 7), network node (such as network node 610*a* of FIG. 6 and/or network node 800 of FIG. 8), and host (such as host 616 of FIG. 6 and/or host 900 of FIG. 9) discussed in the preceding paragraphs will now be described with reference to FIG. 11.

Like host 900, embodiments of host 1102 include hardware, such as a communication interface, processing circuitry, and memory. The host 1102 also includes software, which is stored in or accessible by the host 1102 and executable by the processing circuitry. The software includes a host application that may be operable to provide a service to a remote user, such as the UE 1106 connecting via an over-the-top (OTT) connection 1150 extending between the UE 1106 and host 1102. In providing the service to the remote user, a host application may provide user data which is transmitted using the OTT connection 1150.

The network node 1104 includes hardware enabling it to communicate with the host 1102 and UE 1106. The connection 1160 may be direct or pass through a core network (like core network 606 of FIG. 6) and/or one or more other intermediate networks, such as one or more public, private, or hosted networks. For example, an intermediate network may be a backbone network or the Internet.

The UE 1106 includes hardware and software, which is stored in or accessible by UE 1106 and executable by the UE's processing circuitry. The software includes a client application, such as a web browser or operator-specific "app" that may be operable to provide a service to a human or non-human user via UE 1106 with the support of the host 1102. In the host 1102, an executing host application may communicate with the executing client application via the OTT connection 1150 terminating at the UE 1106 and host 1102. In providing the service to the user, the UE's client application may receive request data from the host's host application and provide user data in response to the request data. The OTT connection 1150 may transfer both the request data and the user data. The UE's client application may interact with the user to generate the user data that it provides to the host application through the OTT connection 1150.

The OTT connection 1150 may extend via a connection 1160 between the host 1102 and the network node 1104 and via a wireless connection 1170 between the network node 1104 and the UE 1106 to provide the connection between the host 1102 and the UE 1106. The connection 1160 and wireless connection 1170, over which the OTT connection 1150 may be provided, have been drawn abstractly to illustrate the communication between the host 1102 and the UE 1106 via the network node 1104, without explicit reference to any intermediary devices and the precise routing of messages via these devices.

As an example of transmitting data via the OTT connection 1150, in step 1108, the host 1102 provides user data, which may be performed by executing a host application. In some embodiments, the user data is associated with a particular human user interacting with the UE 1106. In other embodiments, the user data is associated with a UE 1106 that shares data with the host 1102 without explicit human interaction. In step 1110, the host 1102 initiates a transmission carrying the user data towards the UE 1106. The host 1102 may initiate the transmission responsive to a request transmitted by the UE 1106. The request may be caused by human interaction with the UE 1106 or by operation of the client application executing on the UE 1106. The transmission may pass via the network node 1104, in accordance with the teachings of the embodiments described throughout this disclosure. Accordingly, in step 1112, the network node

1104 transmits to the UE 1106 the user data that was carried in the transmission that the host 1102 initiated, in accordance with the teachings of the embodiments described throughout this disclosure. In step 1114, the UE 1106 receives the user data carried in the transmission, which may be performed by a client application executed on the UE 1106 associated with the host application executed by the host 1102.

In some examples, the UE 1106 executes a client application which provides user data to the host 1102. The user data may be provided in reaction or response to the data received from the host 1102. Accordingly, in step 1116, the UE 1106 may provide user data, which may be performed by executing the client application. In providing the user data, the client application may further consider user input received from the user via an input/output interface of the UE 1106. Regardless of the specific manner in which the user data was provided, the UE 1106 initiates, in step 1118, transmission of the user data towards the host 1102 via the network node 1104. In step 1120, in accordance with the teachings of the embodiments described throughout this disclosure, the network node 1104 receives user data from the UE 1106 and initiates transmission of the received user data towards the host 1102. In step 1122, the host 1102 receives the user data carried in the transmission initiated by the UE 1106.

One or more of the various embodiments improve the performance of OTT services provided to the UE 1106 using the OTT connection 1150, in which the wireless connection 1170 forms the last segment. More precisely, the teachings of these embodiments may improve LOS/NLOS detection of a link, and thereby provide benefits such as improved connection reliability, optimization of the channel, higher quality timing measurements, and improved positioning and position estimation.

In an example scenario, factory status information may be collected and analyzed by the host 1102. As another example, the host 1102 may process audio and video data which may have been retrieved from a UE for use in creating maps. As another example, the host 1102 may collect and analyze real-time data to assist in controlling vehicle congestion (e.g., controlling traffic lights). As another example, the host 1102 may store surveillance video uploaded by a UE. As another example, the host 1102 may store or control access to media content such as video, audio, VR or AR which it can broadcast, multicast or unicast to UEs. As other examples, the host 1102 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1150 between the host 1102 and UE 1106, in response to variations in the measurement results. The measurement procedure and/or the network functionality for reconfiguring the OTT connection may be implemented in software and hardware of the host 1102 and/or UE 1106. In some embodiments, sensors (not shown) may be deployed in or in association with other devices through which the OTT connection 1150 passes: the sensors may participate in the measurement procedure by supplying values of the monitored quantities exemplified above, or supplying values of other physical quantities from which software may compute or estimate the monitored quantities. The reconfiguring of the OTT connection 1150 may include message format, retransmission settings, preferred routing etc.; the reconfiguring need not directly alter the operation of the network node 1104. Such procedures and functionalities may be known and practiced in the art. In certain embodiments, measurements may involve proprietary UE signaling that facilitates measurements of throughput, propagation times, latency and the like, by the host 1102. The measurements may be implemented in that software causes messages to be transmitted, in particular empty or 'dummy' messages, using the OTT connection 1150 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

FURTHER EXAMPLES

Group A Examples

A1. A method performed by a user equipment for reporting channel information, the method comprising: receiving a signal from a node (e.g., gNB); generating a Channel Impulse Response (CIR) based at least in part on the received signal; and reporting the CIR to a Location Management Function (LMF).

A2. The method of A1, further comprising the step of: performing a line-of-site (LOS) or non-LOS (NLOS) detection for a link between the node and user equipment, based at least in part on the generated CIR.

A3. The method of A1 or A2, wherein an LOS/NLOS determination is reported to the LMF with the CIR.

A4. The method of any of A1-A3, wherein reporting to the LMF comprises reporting information on an FFT window (e.g., window placement) used for generating the CIR.

A5. The method of any of A1-A4, wherein the received signal comprises reference signals.

A6. The method of any of A1-A5, wherein a CIR is generated and reported for every resource and antenna pair for the link between the node and user equipment.

A7. The method of any of A1-A6, further comprising the step of: receiving a response (e.g., from or via the node or LMF), wherein the response indicates one or more of: (i) the validity of an LOS/NLOS determination made by the user equipment, (ii) an FFT window configuration (e.g., time shift or other adjustment), and/or (iii) a CIR discrepancy (e.g., between the node and the user equipment).

A8. The method of any of A1-A7, wherein the reporting is performed using LTE Positioning Protocol (LPP) via the node.

A9. The method of any of the previous examples, further comprising: providing user data; and forwarding the user data to a host via the transmission to the network node.

Group B Examples

B1. A method (400) performed by a network node for reporting channel information, the method comprising: receiving (410) a signal from a device (e.g., UE); generating (420) a Channel Impulse Response (CIR) based at least in part on the received signal; and reporting (430) the CIR to a Location Management Function (LMF).

B2. The method of B1, wherein reporting to the LMF comprises reporting information on an FFT window (e.g., window placement) used for generating the CIR.

B3. The method B1 or B2, wherein the received signal comprises reference signals.

B4. The method of any of B1-B3, wherein a CIR is generated and reported for every resource and antenna pair for the link between the node and user equipment.

B5. The method of any of B1-B4, further comprising the step of: receiving a response (e.g., from the LMF), wherein the response indicates one or more of: (i) an FFT window configuration (e.g., time shift or other adjustment), and/or (ii) a CIR discrepancy (e.g., between the node and the user equipment).

B6. The method of any of B1-B6, wherein the reporting is performed using NR Positioning Protocol A (NRPPa).

B7. The method of any of the previous examples, further comprising: obtaining user data; and forwarding the user data to a host or a user equipment.

Group C Examples

C1. A method (500) performed by a network node (e.g., Location Management Function, LMF) for evaluating one or more Chanel Impulse Responses (CIRs), the method comprising: receiving (510) a CIR from each of a device (e.g., UE) and a node (e.g., gNB); and performing (520) a validity determination regarding one or more of the received CIRs.

C2. The method of C1, further comprising the step of: receiving one or more of FFT window information (e.g., placement) and/or an LOS/NLOS detection decision from the UE and/or gNB.

C3. The method of C2, further comprising the step of: agreeing or disagreeing (530) with at least an LOS/NLOS detection decision (e.g., validating or otherwise determining whether an LOS/NLOS detection decision is correct).

C4. The method of any of C1-C3, further comprising the step of: providing (540) a response to the UE or gNB.

C5. The method of C4, wherein the response indicates one or more of: (i) the validity of an LOS/NLOS determination made by the UE, (ii) an FFT window configuration (e.g., time shift or other adjustment), and/or (iii) a CIR discrepancy (e.g., between the gNB and the UE).

C6. The method of any of C1-C5, wherein communications with the UE and/or gNB are performed via LPP or NRPPa.

C7. The method of any of C1-C6, wherein the validity determination is based on a correlation of CIRs from the gNB and the UE.

C8. The method of any of C1-C7, wherein the validity determination is based on whether an FFT window placement by the UE and/or gNB is optimal for time of arrival estimation.

C9. The method of any of C1-C8, further comprising the step of: establishing the levels of reciprocity between the UE and the gNB.

C10. The method of any of C3-C9, wherein the agreeing or disagreeing with the LOS/NLOS detection decision is based on the method used by the UE in deciding the link nature (e.g., where the LOS/NLOS decision in not based on CIR).

C11. The method of any of C1-C10, wherein CIR are received from multiple gNBs for a UE and one or more of validating CIRs and/or determining the validity of an LOS/NLOS determination is based on information received from multiple gNBs.

C12. The method of any of C1-C11, further comprising the step of: performing one or more location/positioning functions based on any of the foregoing.

C13. The method of any of the previous examples, further comprising: obtaining user data; and forwarding the user data to a host or a user equipment.

Group D Examples

D1. A user equipment for reporting channel information, comprising: processing circuitry configured to perform any of the steps of any of the Group A examples; and power supply circuitry configured to supply power to the processing circuitry.

D2. A network node for reporting channel information, the network node comprising: processing circuitry configured to perform any of the steps of any of the Group B examples: power supply circuitry configured to supply power to the processing circuitry.

D3. A network node for evaluating one or more Chanel Impulse Responses (CIRs), the network node comprising: processing circuitry configured to perform any of the steps of any of the Group C examples: power supply circuitry configured to supply power to the processing circuitry.

D4. A user equipment (UE) for reporting channel information, the UE comprising: an antenna configured to send and receive wireless signals: radio front-end circuitry connected to the antenna and to processing circuitry, and configured to condition signals communicated between the antenna and the processing circuitry: the processing circuitry being configured to perform any of the steps of any of the Group A examples: an input interface connected to the processing circuitry and configured to allow input of information into the UE to be processed by the processing circuitry: an output interface connected to the processing circuitry and configured to output information from the UE that has been processed by the processing circuitry; and a battery connected to the processing circuitry and configured to supply power to the UE.

D5. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A examples to receive the user data from the host.

D6. The host of the previous embodiment, wherein the cellular network further includes a network node configured to communicate with the UE to transmit the user data to the UE from the host.

D7. The host of the previous 2 examples, wherein: the processing circuitry of the host is configured to execute a host application, thereby providing the user data; and the host application is configured to interact with a client application executing on the UE, the client application being associated with the host application.

D8. A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A examples to receive the user data from the host.

D9. The method of the previous example, further comprising: at the host, executing a host application associated with a client application executing on the UE to receive the user data from the UE.

D10. The method of the previous example, further comprising: at the host, transmitting input data to the client application executing on the UE, the input data being provided by executing the host application, wherein the user data is provided by the client application in response to the input data from the host application.

D11. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A examples to transmit the user data to the host.

D12. The host of the previous example, wherein the cellular network further includes a network node configured to communicate with the UE to transmit the user data from the UE to the host.

D13. The host of the previous 2 examples, wherein: the processing circuitry of the host is configured to execute a host application, thereby providing the user data; and the host application is configured to interact with a client application executing on the UE, the client application being associated with the host application.

D14. A method implemented by a host configured to operate in a communication system that further includes a network node and a user equipment (UE), the method comprising: at the host, receiving user data transmitted to the host via the network node by the UE, wherein the UE performs any of the steps of any of the Group A examples to transmit the user data to the host.

D15. The method of the previous example, further comprising: at the host, executing a host application associated with a client application executing on the UE to receive the user data from the UE.

D16. The method of the previous example, further comprising: at the host, transmitting input data to the client application executing on the UE, the input data being provided by executing the host application, wherein the user data is provided by the client application in response to the input data from the host application.

D17. A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B and/or Group C examples to transmit the user data from the host to the UE.

D17. The host of the previous example, wherein: the processing circuitry of the host is configured to execute a host application that provides the user data; and the UE comprises processing circuitry configured to execute a client application associated with the host application to receive the transmission of user data from the host.

D18. A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B and/or Group C examples to transmit the user data from the host to the UE.

D19. The method of the previous example, further comprising, at the network node, transmitting the user data provided by the host for the UE.

D20. The method of any of the previous 2 examples, wherein the user data is provided at the host by executing a host application that interacts with a client application executing on the UE, the client application being associated with the host application.

D21. A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B and/or Group C examples to transmit the user data from the host to the UE.

D22. The communication system of the previous example, further comprising: the network node; and/or the user equipment.

D23. A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B and/or Group C examples to receive the user data from a user equipment (UE) for the host.

D24. The host of the previous 2 examples, wherein: the processing circuitry of the host is configured to execute a host application, thereby providing the user data; and the host application is configured to interact with a client application executing on the UE, the client application being associated with the host application.

D25. The host of the any of the previous 2 examples, wherein the initiating receipt of the user data comprises requesting the user data.

D26. A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B and/or Group C examples to receive the user data from the UE for the host.

D27. The method of the previous example, further comprising at the network node, transmitting the received user data to the host.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, the method comprising:

receiving first Channel Impulse Response (CIR) information for a device and second CIR information for a network node;

performing a comparison of the received first and second CIR information; and receiving one or more of measurement window information or a line-of-sight/non-line-of-sight (LOS/NLOS) detection decision from the device or the network node, further comprising one or more of:

evaluating a reliability of the received first or the second CIR information based at least in part on the comparison, or evaluating a reliability of a position determination for the device based at least in part on the comparison, or evaluating a reliability of the LOS/NLOS detection decision by the device or network node based at least in part on the comparison, or evaluating a CIR measurement window placement of the device or the network node based at least in part on the comparison.

2. The method of claim 1, wherein evaluating the reliability of the LOS/NLOS detection decision comprises validating the decision, wherein:

the validation is based on a correlation of the CIR information from the device and network node, or the validation is based on whether a Fast Fourier Transform (FFT) window placement by the device or network node is acceptable for time of arrival estimation.

3. The method of claim 1, further comprising:

providing a response to the device or network node, wherein the response is based at least in part on the comparison, wherein the response indicates one or more of:

(i) a validity of an LOS/NLOS determination made by the device or the network node, (ii) a new measurement window configuration for LOS/NLOS measurements at the device or the network node, (iii) a value indicative of the level of correlation between the first and the second CIR information, (iv) a reliability metric for LOS/NLOS determinations or CIR measurements at the device or the network node, or (v) an override of an LOS/NLOS determination made by the device or network node.

4. The method of claim 3, wherein the new measurement window configuration is an FFT window parameter for CIR measurements.

5. The method of claim 1, further comprising:

establishing one or more levels of reciprocity between measurements made by the device and the network node.

6. The method of claim 1, wherein at least one of the received first or the second CIR information comprises peak power.

7. The method of claim 6, wherein comparing the first and the second CIR information comprises determining whether a first peak power within an FFT window is also the strongest peak power.

8. The method of claim 1, wherein the method is performed in a server, radio access node, or core network node comprising an LMF.

9. The method of claim 1, wherein the device is a user equipment (UE) and the network node is a gNB.

10. The method of claim 3, wherein the first CIR information is received form the device using the LTE Positioning Protocol (LPP), the second CIR information is received from the network node using the NR Positioning Protocol A (NRPPa), the response is provided to the device using LPP, and the response is provided to the network node using NRPPa.

11. The method of claim 1, wherein the device comprises a plurality of antennas and the first CIR information comprises CIR information corresponding to a plurality of receive beams of the device.

12. A computer program product comprising a non-transitory computer readable medium storing instructions which when performed by processing circuitry of a node causes the node to perform the steps of claim 1.

13. A node configured to:

receive first Channel Impulse Response (CIR) information for a device and second CIR information for a network node;

perform a comparison of the received first and second CIR information; and receive one or more of measurement window information or a line-of-sight/non-line-of-sight (LOS/NLOS) detection decision from the device or the network node, wherein the node is further configured to perform one or more of:

evaluating a reliability of the received first or the second CIR information based at least in part on the comparison, or evaluating a reliability of a position determination for the device based at least in part on the comparison, or evaluating a reliability of the LOS/NLOS detection decision by the device or network node based at least in part on the comparison, or evaluating a CIR measurement window placement of the device or the network node based at least in part on the comparison.

14. A method performed by a user equipment (UE) for reporting channel information, the method comprising:

receiving a signal from a network node;

generating a Channel Impulse Response (CIR) based at least in part on the received signal;

reporting the CIR to a Location Management Function (LMF); and performing a line-of-sight/non-line-of-sight (LOS/NLOS) detection for a link between the network node and the user equipment, based at least in part on the generated CIR, wherein an LOS/NLOS determination is reported to the LMF with the CIR, wherein reporting to the LMF comprises reporting information on a placement of a Fast Fourier Transform (FFT) window used for generating the CIR.

15. The method of claim 14, wherein the received signal comprises a plurality of reference signals.

16. The method of claim 14, wherein the user equipment comprises a plurality of antennas and a CIR is generated and reported for every resource and antenna pair for a link between the network node and the user equipment.

17. The method of claim 14, further comprising:

receiving a response from the LMF, wherein the response indicates one or more of:

(i) a validity of an LOS/NLOS determination made by the user equipment, (ii) a new FFT window configuration, (iii) an indication of discrepancy between CIR information reported from the network node and reported by the user equipment, (iv) a reliability metric for LOS/NLOS determinations or CIR measurements made by the user equipment, or (v) an override of an LOS/NLOS determination made by the user equipment.

18. A computer program product comprising a non-transitory computer readable medium storing instructions which when performed by processing circuitry of a device causes the device to perform the steps of claim 14.

19. A method performed by a network node for reporting channel information, the method comprising:

receiving a signal from a device;

generating a Channel Impulse Response (CIR) based at least in part on the received signal;

reporting the CIR to a Location Management Function (LMF), wherein reporting to the LMF comprises reporting information on a placement of a Fast Fourier Transform (FFT) window used for generating the CIR; and receiving a response from the LMF, wherein the response indicates one or more of: (i) a new FFT window configuration, or (ii) an indication of discrepancy between CIR information reported from the network node and reported by the device.

20. The method of claim 19, wherein a CIR is generated and reported for every resource and antenna pair for a link between the node and the device.

21. A computer program product comprising a non-transitory computer readable medium storing instructions which when performed by processing circuitry of a node causes the node to perform the steps of claim 19.

22. A network node configured to:

receive a signal from a device;

generate a Channel Impulse Response (CIR) based at least in part on the received signal;

report the CIR to a Location Management Function (LMF); and receive a response from the LMF, wherein the response indicates one or more of: (i) a new FFT window configuration, or (ii) an indication of discrepancy between CIR information reported from the network node and reported by the device.

* * * * *